(12) United States Patent  
Gallagher

(10) Patent No.: US 7,711,145 B2  
(45) Date of Patent: May 4, 2010

(54) FINDING IMAGES WITH MULTIPLE PEOPLE OR OBJECTS

(75) Inventor: Andrew C. Gallagher, Brockport, NY (US)

(73) Assignee: Eastman Kodak Company, Rochester, NY (US)

( * ) Notice: Subject to any disclaimer, the term of this patent is extended or adjusted under 35 U.S.C. 154(b) by 961 days.

(21) Appl. No.: 11/342,053

(22) Filed: Jan. 27, 2006

(65) Prior Publication Data

US 2007/0177805 A1 Aug. 2, 2007

(51) Int. Cl.
*G06K 9/00* (2006.01)
*H04N 5/225* (2006.01)
*G06T 13/00* (2006.01)

(52) U.S. Cl. .................. 382/103; 348/169; 345/473

(58) Field of Classification Search .................. 382/103, 382/107, 115, 116, 117, 118, 190, 305; 348/169, 348/170, 171, 172, 231.2, 94, 154, 155, 208.14, 348/352.356; 707/3, 104.1; 345/473
See application file for complete search history.

(56) References Cited

U.S. PATENT DOCUMENTS 7,366,330 B2 * 4/2008 Ito .............................. 382/118
2003/0169906 A1 * 9/2003 Gokturk et al. ............. 382/115

2005/0147302 A1 * 7/2005 Leung ......................... 382/190

OTHER PUBLICATIONS

Jones et al, Fast Multi-view Face Detection, IEEE Conf. on Computer Vision and Pattern Recognition (CVPR), Jun. 2003.
Yuille et al, Feature Extraction from Faces Using Deformable Templates, Int. Journal of Comp. Vis., vol. 8, Iss. 2, 1992, pp. 99-111.
Cootes et al, Constrained Active Appearance Models, 8th International Conf. on Computer Vision, vol. 1, pp. 748-754, IEEE Computer Society Press, Jul. 2001.
Bolin et al, An Automatic Facial Feature Finding System For Portrait Images, Proceedings of IS&T PICS Conference 2002.
Turk et al, Eigenfaces for Recognition, Journal of Cognitive Neuroscience, vol. 3, No. 1, 71-86, 1991.
Wiskott, Phantom Faces for Face Analysis, Pattern Recognition 30(6):837-846 (1997).
Chen et al Face Annotation for Family Photo Album Management, Inter. Jour. of Image and Graphics, Vo. 3, No. 1 (2003) 1-14.

* cited by examiner

*Primary Examiner*—Abolfazl Tabatabai
(74) *Attorney, Agent, or Firm*—Raymond L. Owens

(57) ABSTRACT

A method of searching through a collection of images, includes providing a list of individuals of interest and features associated with such individuals; detecting people in the collection images; determining the likelihood(s) for each listed individual of appearing in each collection image in response to the detected people and the features associated with the listed individuals; and selecting in response to the determined likelihood(s) a number of collection images such that each individual from the list appears in the selected number of collection images.

18 Claims, 14 Drawing Sheets

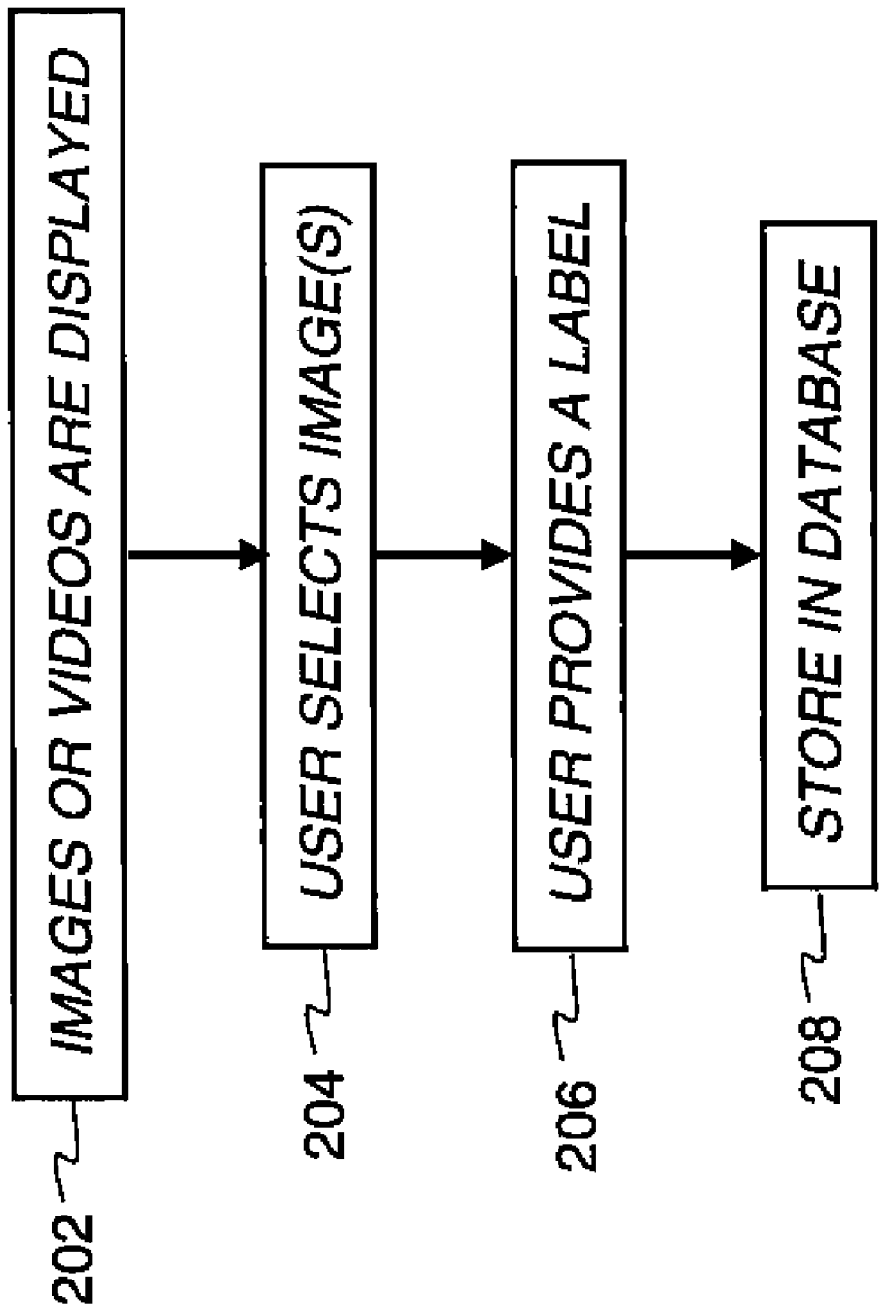

FINDING IMAGES WITH MULTIPLE PEOPLE OR OBJECTS

CROSS REFERENCE TO RELATED APPLICATIONS

Reference is made to commonly assigned U.S. patent application Ser. No. 11/116,729 filed Apr. 28, 2005, entitled "Using Time in Recognizing Persons in Images" by Andrew C. Gallagher and U.S. patent application Ser. No. 11/263,156 filed Oct. 31, 2005, entitled "Determining a Particular Person From a Collection" by Andrew C. Gallagher, the disclosures of which are incorporated herein by reference.

FIELD OF THE INVENTION

The invention relates generally to the field of image processing. More specifically, the invention relates to searching for images containing specific individuals or objects of interest.

BACKGROUND OF THE INVENTION

With the advent of digital photography, consumers are amassing large collections of digital images and videos. The average number of images captures with digital cameras per photographer is still increasing each year. As a consequence, the organization and retrieval of images and videos is already a problem for the typical consumer. Currently, the length of time spanned by a typical consumer's digital image collection is only a few years. The organization and retrieval problem will continue to grow as the length of time spanned by the average digital image and video collection increases.

A user desires to find images and videos containing a particular person of interest. The user can perform a manual search to find images and videos containing the person of interest. However this is a slow, laborious process. Even though some commercial software (e.g. Adobe Album) permits users to tag images with labels indicating the people in the images so that searches can later be done, the initial labeling process is still very tedious and time consuming.

Face recognition software assumes the existence of a ground-truth labeled set of images (i.e. a set of images with corresponding person identities). Most consumer image collections do not have a similar set of ground truth. In addition, the labeling of faces in images is complex because many consumer images have multiple persons. So simply labeling an image with the identities of the people in the image does not indicate which person in the image is associated with which identity.

There exists many image processing packages that attempt to recognize people for security or other purposes. Some examples are the FaceVACS face recognition software from Cognitec Systems GmbH and the Facial Recognition SDKs from Imagis Technologies Inc. and Identix Inc. These packages are primarily intended for security-type applications where the person faces the camera under uniform illumination, frontal pose and neutral expression. These methods are not suited for use in personal consumer images due to the large variations in pose, illumination, expression and face size encountered in images in this domain.

In the article "Face Annotation for Family Photo Album Management", International Journal of Image and Graphics, Vol. 3, No. 1 (2003), pp. 1-14 a face annotation with automatic recognition is described. However, this system does not solve the problem that arises when attempting to search for images containing more than one individual of interest. Specifically, this system does not solve the problem of searching for a set of images such that each of a set of individuals or objects of interest is contained within the set of images.

SUMMARY OF THE INVENTION

It is an object of the present invention to readily identify objects or persons of interests in images or videos in a digital image collection.

This object is achieved by a method of searching through a collection of images, comprising:

(a) providing a list of individuals of interest and features associated with such individuals;

(b) detecting people in the collection images;

(c) determining the likelihood(s) for each listed individual of appearing in each collection image in response to the detected people and the features associated with the listed individuals; and (d) selecting in response to the determined likelihood(s) a subset of one or more collection images such that at least two individuals from the list appear in the selected number of collection images.

The present invention has the advantage of permitting users to find sets of images containing individuals or objects of interest from a list of individuals or objects of interest for creating an image product such as a calendar. A further advantage of the present invention is that images are automatically labeled with labels related to the individual or object of interest, and permitting the user to review the labels.

BRIEF DESCRIPTION OF THE DRAWINGS

The subject matter of the invention is described with reference to the embodiments shown in the drawings.

FIG. 9 is a flow chart of the procedure for labeling an image from the digital image collection;

DETAILED DESCRIPTION OF THE INVENTION

In the following description, some embodiments of the present invention will be described as software programs. Those skilled in the art will readily recognize that the equivalent of such a method may also be constructed as hardware or software within the scope of the invention.

Because image manipulation algorithms and systems are well known, the present description will be directed in particular to algorithms and systems forming part of, or cooperating more directly with, the method in accordance with the present invention. Other aspects of such algorithms and systems, and hardware or software for producing and otherwise processing the image signals involved therewith, not specifically shown or described herein can be selected from such systems, algorithms, components, and elements known in the art. Given the description as set forth in the following specification, all software implementation thereof is conventional and within the ordinary skill in such arts.

Figure 1:
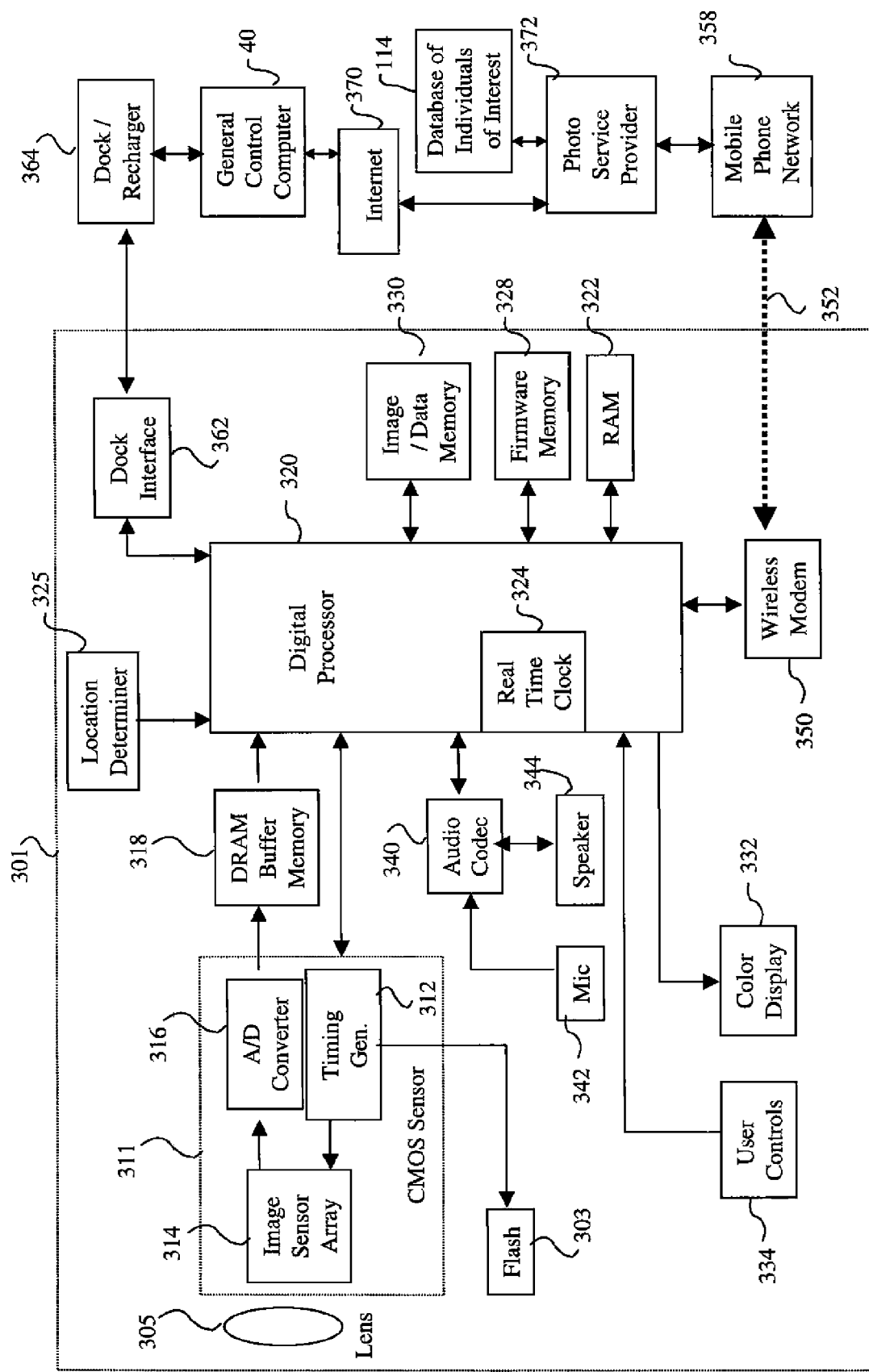
FIG. 1 is a block diagram of a camera phone based imaging system that can implement the present invention.

FIG. 1 is a block diagram of a digital camera phone 301 based imaging system that can implement the present invention. The digital camera phone 301 is one type of digital camera. Preferably, the digital camera phone 301 is a portable battery operated device, small enough to be easily handheld by a user when capturing and reviewing images. The digital camera phone 301 produces digital images that are stored using an image data/memory 330, which can be, for example, internal Flash EPROM memory, or a removable memory card. Other types of digital image storage media, such as magnetic hard drives, magnetic tape, or optical disks, can alternatively be used to provide the image/data memory 330.

The digital camera phone 301 includes a lens 305 that focuses light from a scene (not shown) onto an image sensor array 314 of a CMOS image sensor 311. The image sensor array 314 can provide color image information using the well-known Bayer color filter pattern. The image sensor array 314 is controlled by a timing generator 312, which also controls a flash 303 in order to illuminate the scene when the ambient illumination is low. The image sensor array 314 can have, for example, 2560 columns×1920 rows of pixels.

In some embodiments, the digital camera phone 301 can also store video clips, by summing multiple pixels of the image sensor array 314 together (e.g. summing pixels of the same color within each 4 column×4 row area of the image sensor array 314) to produce a lower resolution video image frame. The video image frames are read from the image sensor array 314 at regular intervals, for example using a 24 frame per second readout rate.

The analog output signals from the image sensor array 314 are amplified and converted to digital data by the analog-to-digital (A/D) converter circuit 316 on the CMOS image sensor 311. The digital data is stored in a DRAM buffer memory 318 and subsequently processed by a digital processor 320 controlled by the firmware stored in firmware memory 328, which can be flash EPROM memory. The digital processor 320 includes a real-time clock 324, which keeps the date and time even when the digital camera phone 301 and digital processor 320 are in their low power state.

The processed digital image files are stored in the image/data memory 330.

In the still image mode, the digital processor 320 performs color interpolation followed by color and tone correction, in order to produce rendered sRGB image data. The digital processor 320 can also provide various image sizes selected by the user. The rendered sRGB image data is then JPEG compressed and stored as a JPEG image file in the image/data memory 330. The JPEG file uses the so-called "Exif" image format described earlier. This format includes an Exif application segment that stores particular image metadata using various TIFF tags. Separate TIFF tags can be used, for example, to store the date and time the picture was captured, the lens f/number and other camera settings, and to store image captions. In particular, the ImageDescription tag can be used to store labels. The real-time clock 324 provides a capture date/time value, which is stored as date/time metadata in each Exif image file.

The digital processor 320 also produces a low-resolution "thumbnail" size image, which can be produced as described in commonly-assigned U.S. Pat. No. 5,164,831 to Kuchta, et al., the disclosure of which is herein incorporated by reference. The thumbnail image can be stored in a RAM memory 322 and supplied to a color display 332, which can be, for example, an active matrix LCD or organic light emitting diode (OLED). After images are captured, they can be quickly reviewed on the color LCD image display 332 by using the thumbnail image data.

The graphical user interface displayed on the color display 332 is controlled by user controls 334. The user controls 334 can include dedicated push buttons (e.g. a telephone keypad) to dial a phone number, a control to set the mode (e.g. "phone" mode, "camera" mode), a joystick controller that includes 4-way control (up, down, left, right) and a push-button center "OK" switch, or the like.

An audio codec 340 connected to the digital processor 320 receives an audio signal from a microphone 342 and provides an audio signal to a speaker 344. These components can be used both for telephone conversations and to record and playback an audio track, along with a video sequence or still image. The speaker 344 can also be used to inform the user of an incoming phone call. This can be done using a standard ring tone stored in firmware memory 328, or by using a custom ring-tone downloaded from a mobile phone network 358 and stored in the image/data memory 330. In addition, a vibration device (not shown) can be used to provide a silent (e.g. non audible) notification of an incoming phone call.

A dock interface 362 can be used to connect the digital camera phone 301 to a dock/charger 364, which is connected to a general control computer 40. The dock interface 362 can conform to, for example, the well-know USB interface specification. Alternatively, the interface between the digital camera 301 and the general control computer 40 can be a wireless interface, such as the well-known Bluetooth wireless interface or the well-know 802.11 b/g wireless interface. The dock interface 362 can be used to download images from the image/data memory 330 to the general control computer 40. The dock interface 362 can also be used to transfer calendar information from the general control computer 40 to the image/data memory in the digital camera phone 301. The dock/charger 364 can also be used to recharge the batteries (not shown) in the digital camera phone 301.

The digital processor 320 is coupled to a wireless modem 350, which enables the digital camera phone 301 to transmit and receive information via an RF channel 352. A wireless modem 350 communicates over a radio frequency (e.g. wireless) link with the mobile phone network 358, such as a 3GSM network. The mobile phone network 358 communicates with a photo service provider 372, which can store digital images uploaded from the digital camera phone 301. These images can be accessed via the Internet 370 by other devices, including the general control computer 40. The mobile phone network 358 also connects to a standard telephone network (not shown) in order to provide normal telephone service.

Figure 2:
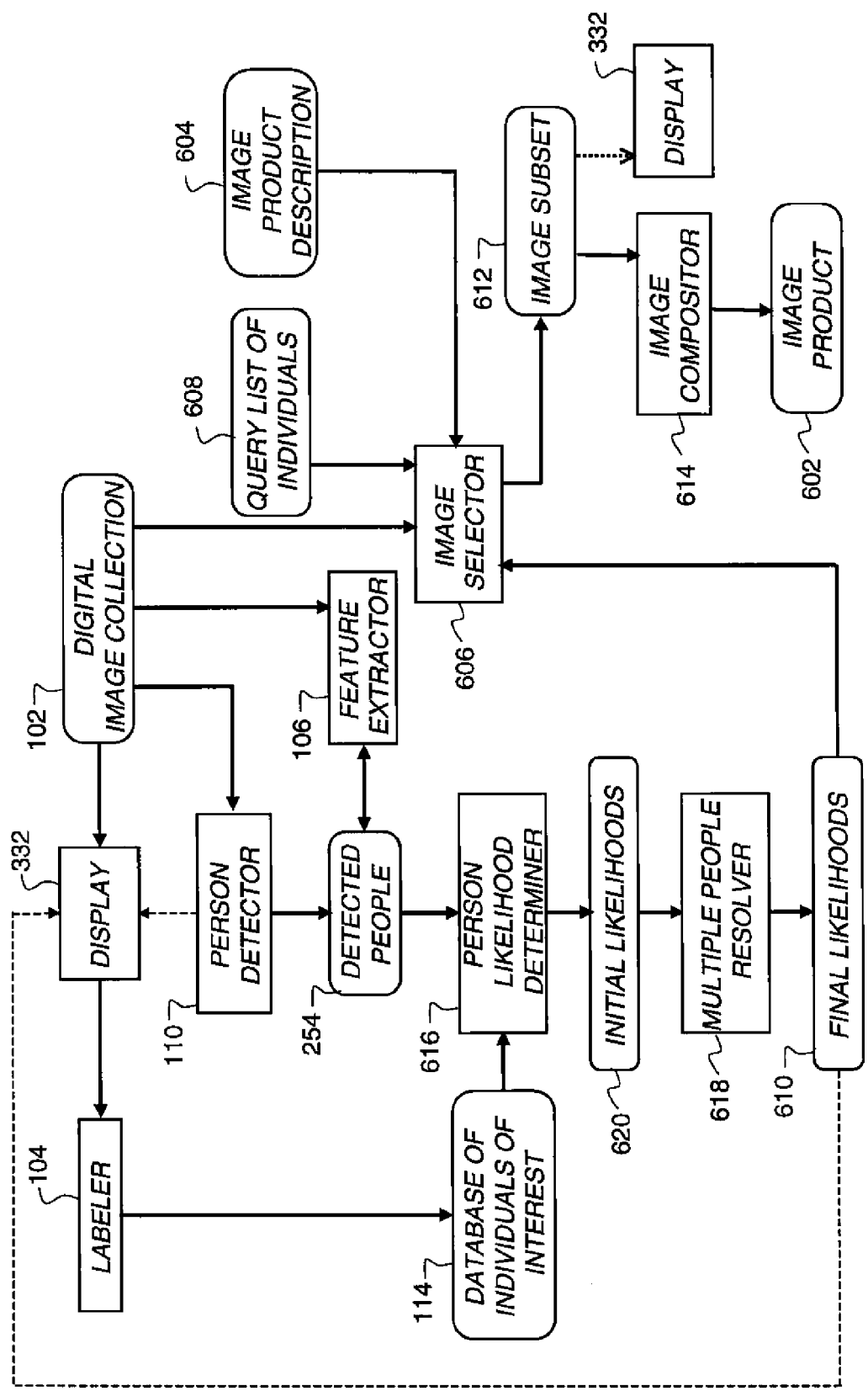
FIG. 2 is a flow chart of an embodiment of the present invention for finding a subset of images that contain individuals from a query list of individuals in a digital image collection.

An embodiment of the invention is illustrated in FIG. 2. A digital image collection 102 containing people is searched for a person of interest by a person finder 108. A digital image collection subset 112 is the set of images from the digital image collection 102 believed to contain the person of interest. The digital image collection 102 includes both images and videos. For convenience, the term "image" refers to both single images and videos. Videos are a collection of images with accompanying audio and sometimes text. The digital image collection subset 112 is displayed on the display 332 for review by the human user.

The preferred embodiment of the invention describes both the classification of the identities of individuals in images, and the selection of images containing individuals of interest. A user is interested in creating an image product 602. The image product 602 is a product that uses at least one image from a digital image collection 102 in its creation. Examples of image products 602 include:

- framed photographs. Framed photographs contain windows for viewing one or more photographs (i.e. printed images.) Also, digital frames contain a screen capable of displaying multiple images at a given time, or multiple images by cycling through a set of images over time.
- photo calendar. Calendars typically contain an area to display an image for each month or week included in the span of the calendar. A calendar can be printed on paper, or be contained in computer memory and viewed via a display such as an LCD display.
- album. A photo album typically contains multiple pages and each page con show one or more images. As with a calendar, an album can be printed or viewed via a display.
- slide show. A slide show (i.e. a series of images that is displayed sequentially) can be stored in memory, or saved to media such as a DVD.
- web page. A web page can contain a set of images including thumbnail images that, when clicked by a mouse or otherwise selected by a user, display a larger version of the image.

Other image products 602 include mugs, t-shirts, mouse pads, puzzles, etc. upon which images are printed.

It is common that a user desires to produce an image product 602 containing images of individuals that are important to him or her. For example, a user might want to produce a calendar containing images of her three children.

The user provides a query list of individuals 608 to the image selector 606. The query list of individuals 608 contains the identities of the individuals, number of times they are to appear in the image project 602, and a relative priority value.

As an example, a query list of individuals is:

| Individual | times to appear | priority |
|---|---|---|
| Mike | 1 | 1 |
| Jeff | 1 | 1 |

| Individual | times to appear | priority |
|---|---|---|
| Renee | 1 | 1 |
| Andy | 1 | 1 |
| Dan | 1 | 1 |
| Michael | 2 | 2 |
| Marie | 2 | 2 |

Preferably, the number of times an individual of interest appears in the image project 602 is a minimum. Alternatively, the number of times an individual of interest appears in an image project can be an exact number, or a maximum. The identities of individuals of interest can be expressed with index numbers rather than names. For example, the query list of individuals has R rows, where each row r contains the identity of an individual of interest $1_r$, the number of times $c_r$ that individual should appear in the image subset 612, an a priority weight $p_r$ for that individual.

The image product description 604 is also passed to an image selector 606. The image product description 604 contains information related to the number of images, sizes of those images, duration that each image will be displayed, etc. For example, a photo frame contains 3 windows, each sized 4×6 inches, for displaying images. The image product description 604 can be a range. For example, a calendar can require 12 to 24 images depending on whether one or two images are shown for each month. The range can be accompanied with a priority. For example, a calendar having 12 images is preferred with a score of 10, though the calendar can also have 24 images with a preference score of 5. The image product description 604 can be to reduce or minimize the number of image. The image product description 604 may also contain a requirement for a specific number of landscape (an image that is wider than it is tall) vs. portrait (a image that is taller than it is wide) format. The image selector 606 also has access to a final likelihoods 610.

The image selector 606 solves the following problem: to determine an image subset 612 composed of a number of images from the digital image collection 102 that contain all (or as many as possible) of the individuals from the query list of individuals 608. The number of selected images is dictated by the image product description 604, or by the number of images required to contain all of the individuals from the query list of individuals 608. The selected image subset 612 is then processed by an image compositor 614 for creating the image product 602. The action of the image compositor 614 is well known. The image selector 606 determines an overall score for the image subset 612 that is generated. The score indicates the likelihood that over all the images in the image subset 612, all of the individuals from the query list of individuals 608 are present the number of times that is requested. The image selector 606 will be described more hereinbelow.

The search for an image subset 612 containing individuals conforming to the query list of individuals 608 is initiated by a user as follows: Images or videos of the digital image collection 102 are displayed on the display 332 and viewed by the user. The user establishes one or more labels for one or more of the images with a labeler 104. A feature extractor 106 extracts features from the digital image collection 102 in association with the label(s) from the labeler 104. The features are stored in association with labels in a database of individuals of interest 114. A person detector 110 (defined hereinbelow) can optionally be used to assist in the labeling and feature extraction. When the digital image collection subset 112 is displayed on the display 332, the user can review the results and further label the displayed images. A label from the labeler 104 indicates that a particular image or video contains a person of interest and includes at least one of the following:

(1) the name of a person of interest in an image or video. A person's name can be a given name or a nickname.

(2) an identifier associated with the person of interest such as a text string or identifier such as "Person A" or "Person B" or "Person 1" or "Person 2".

(3) the location of the person of interest within the image or video. Preferably, the location of the person of interest is specified by the coordinates (e.g. the pixel address of row and column) of the eyes of the person of interest (and the associated frame number in the case of video). Alternatively, the location of the person of interest can be specified by coordinates of a box that surrounds the body or the face of the person of interest. As a further alternative, the location of the person of interest can be specified by coordinates indicating a position contained within the person of interest. The user can indicate the location of the person of interest by using a mouse to click on the positions of the eyes for example. When the person detector 110 detects a person, the position of the person can be highlighted to the user by, for example, circling the face on the display 332. Then the user can provide the name or identifier for the highlighted person via the labeler 104, thereby associating the position of the person with the user provided label. When more than one person is detected in an image, the positions of the persons can be highlighted in turn and labels can be provided by the user for any of the people. In a video, location includes the time or frame numbers that the person of interest appears in as well as the location within that frame of the person.

(4) an indication to search for images or videos from the image collection believed to contain the person of interest.

(5) the name or identifier of a person of interest who is not in the image.

The digital image collection 102 contains at least one image having more than one person. A label is provided by the user via the labeler 104, indicating that the image contains a person of interest. Features related to the person of interest are determined by the feature extractor 106, and these features are used by the person finder 108 to identify other images in the collection that are believed to contain the person of interest.

The terms "tag", "caption", and "annotation" are used synonymously with the term "label."

The database of individuals of interest 114 includes a description of the distribution of features associated with the different individuals who have been labeled by the labeler 104. This distribution can be formed by, for example, fitting a Gaussian (or some other statistical distribution) to the features associated with each individual. Or, the distribution can simply be the set of all the features associated with each unique individual.

The person detector 110 detects people in the digital image collection 102. Detected people 254 each have features computed by the feature extractor 106. As previously described, some of the detected people 254 are labeled by the labeler 104, but others are not labeled and the identity of the person is unknown. The purpose of a person likelihood determiner 616 and a multiple people resolver 618 is to determine the identities of the people that are unlabeled based on the features of the labeled people (stored in the database of individuals of interest 114). The labeled people can be, and likely are, from images other than the current image under consideration.

The person likelihood determiner 616 is a first classifier. The purpose of the person likelihood determiner 616 is to, for each detected person 254, determine the probability that that person is one of the individuals of interest 114. The person likelihood determiner 616 produces initial likelihoods 620 describing the probability that a detected person 254 is any one of the individuals of interest from the database of individuals of interest 114.

The person likelihood determiner 616 computes a probability matrix Vm of probabilities having N columns (where N is the number of detected people 254 associated with the $m^{th}$ image) and Q rows (where Q is the number of unique individuals in the database of individuals of interest 114) for each of the M images in the collection.

The entries of the matrix Vm are:

$$V_m = \begin{bmatrix} P(p_{1,m} = i_1) & \cdots & P(p_{n,m} = i_1) & \cdots & P(p_{N,m} = i_1) \\ \vdots & \ddots & \vdots & & \\ P(p_{1,m} = i_q) & \cdots & P(p_{n,m} = i_q) & & \vdots \\ \vdots & & & \ddots & \\ P(p_{1,m} = i_Q) & & \cdots & & P(p_{N,m} = i_Q) \end{bmatrix}$$

where $P(p_{n,m}=i_q)$ is the probability that the $n^{th}$ detected person from the $m^{th}$ image has the identity of the $q^{th}$ individual of interest in the database of individuals of interest 114.

The person likelihood determiner 616 computes the terms $P(p_{n,m}=i_q)$ based on the features $f_{nm}$ associated with the person $p_{nm}$. The features $f_{nm}$ are computed by the feature extractor 106 and will be explained in more detail hereinbelow. The term $P(p_{n,m}=i_q)$ can also be written as $P(p_{n,m}=i_q|f_{n,m})$ because the determined probability depends on the feature values.

Preferably, the term $P(p_{n,m}=i_q)$ is computed by the person likelihood determiner 616 independent of the feature values of other detected people 254 from the same image and can also be computed independent of the other individuals (other than individual q) in the database of individuals of interest 114.

For example, for a particular image, the matrix V describing the initial likelihoods 620 as computed by the person likelihood determiner 616 could be:

$$V = \begin{bmatrix} .2 & 0 \\ .8 & .5 \\ 0 & .75 \\ 0 & 0 \end{bmatrix}$$

In this example, there are three detected people 254 associated with the image and there are five individuals in the database of individuals of interest 114. The elemental probabilities in the matrix V are computed independently, so there are some elements, due to the fact that multiple people are in the image and multiple individuals are in the database of individuals of interest 114, that apparently contradict the rules of logic. In the example, the probability that the first detected person 254 is the second individual is 0.8, while the probability that the second detected person 254 is the second individual is 0.5. This is clearly not possible, because the sum of the probabilities cannot exceed 1.0. Likewise, the second column of the V matrix has a sum greater than 1.0 and is also not logically possible.

The multiple people resolver 618 is a second classifier that enforces these logical rules and improves the utility of the initial likelihoods 620, producing the final likelihoods 610.

The multiple people resolver 618 uses and refines the initial likelihoods 620 from the person likelihood determiner 616 to produce the final likelihoods 610. The multiple people resolver 618 is a second classifier that attempts to reconcile the initial likelihoods 620 with the observation that the probabilities describing whether a detected person 254 is a particular individual of interest are related.

The multiple people resolver 618 uses several rules to resolve the initial likelihoods 620 from the person likelihood determiner 616. The first logical rule is that when several people are in a single still image, each individual can only appear at most one time (except for rare cases involving digital manipulation, mirrors, or images within images). Furthermore, each detected person 254 can only be a single individual. Any row or column of the V matrix having a sum greater than 1.0 violates these logical rules.

The final likelihoods 610 describe the probability that a particular individual appears in an image. Further, the final likelihoods 610 also describe the probability that particular combinations of individuals appear in an image.

The final likelihoods 610 include:

$P(p_{1,m}=i_{q1})$, for images m containing 1 detected person 254. This is the probability that the first detected person is individual $q_1$, where $q_1$ ranges from 1 to Q. These final likelihoods can be arranges in a Q×1 matrix. The sum should be 1.0.

$P(p_{1,m}=i_{q1}, p_{2,m}=i_{q2})$ for images m containing 2 detected people 254. This is the probability that the first detected person is individual $q_1$, and the second detected person is individual $q_2$, where $q_1$ and $q_2$ are the full factorial combinations of the indices 1 to Q. Note that the $P(p_{1,m}=i_{q1}, p_{2,m}=i_{q2})=0$ when $q_1=q_2$. These final likelihoods can be arranged in a Q×Q matrix. The sum should be 1.0.

$P(p_{1,m}=i_{q1}, p_{2,m}=i_{q2}, p_{3,m}=i_{q3})$ for images m containing 3 detected people 254. This is the probability that the first detected person is individual $q_1$, the second detected person is individual $q_2$, and the third detected person is individual $q_3$. There are $Q_3$ probabilities in this final likelihood. The value is zero whenever $q_1=q_2$, $q_1=q_3$, or $q_2=q_3$. The sum should be 1.0.

Those skilled in the art will recognize that the information contained in the final likelihoods can easily be extended according to the above pattern for any number of detected people 254 in the image m.

Furthermore, the final likelihoods 610 contain the information about the probability that the image m contains the individual $q_1$. This is found by summing all the final likelihoods for which one of the detected people is individual $q_1$.

Likewise, the final likelihoods 610 contain the information that a particular detected person $p_{n,m}$ is a specific individual q. This probability is determined by summing all the final likelihoods where the detected person is the individual of interest $p_{n,m}=i_q$.

Although in this description the term probability has been used synonymously with the term likelihood, it is possible to construct a likelihood (i.e. a scoring function) that exceeds 1.0. Such a modification from the description is not materially different from the present embodiment.

The final likelihoods 610 are computed from the initial likelihoods 620 by using the rules that no individual q from the database of individuals of interest 114 can appear more than once in an image, and that each detected person 254 can be at most one individual in the database of individuals of interest.

Note that the database of individuals of interest 114 can contain one individual who represents "everyone else" (i.e. all those individuals who are not explicitly labeled, for instance strangers who appear in the image collection). Usually, this individual has index Q.

The multiple people resolver 618 enforces the logical rules by first determining column sums of the matrix V. For columns having sums exceeding 1.0, the matrix terms are normalized by dividing by the sum. The example likelihoods become:

$$V = \begin{bmatrix} .2 & 0 \\ .8 & .4 \\ 0 & .6 \\ 0 & 0 \end{bmatrix}$$

If the database of individuals of interest has an individual representing "everyone else", then each column is normalized to have a sum of 1.0.

Next, the final likelihoods 610 are computed using Bayes theorem as:

$P(p_{1,m}=i_1, p_{2,m}=i_2)=0.117$ $P(p_{1,m}=i_1, p_{2,m}=i_3)=0.177$ $P(p_{1,m}=i_2, p_{2,m}=i_3)=0.706$

With all other likelihoods being 0. The probability that individual 1 appears in the image is $P(p_{1,m}=i_1$ or $p_{2,m}=i_1)=0.294$. The probability that individual 2 appears (as one of the detected people) in the image is $P(p_{1,m}=i_2$ or $p_{2,m}=i_2)=0.823$. The probability that individual 3 appears in the image is $P(p_{1,m}=i_3$ or $p_{2,m}=i_3)=0.883$. The probability that the first detected person is individual 1 is $P(p_{1,m}=i_1)=0.294$ and the probability is $P(p_{1,m}=i_2)=0.706$ that the first detected person is individual 2. Likewise, the probability that the second detected person is individual 2 is $P(p_{2,m}=i_2)=0.117$ and the probability is $P(p_{2,m}=i_3)=0.883$ that the second detected person is the individual 3. This example demonstrates the effect on the perceived likelihood as a result of considering features from all detected people 254.

Considered collectively, the person likelihood determiner 616 and the multiple people resolver 618 attempt to recognize the identity of a detected person 254 by considering the features associated with the detected person 254 as well as the features associated with other detected people 254 from the same image. In essence, the two classifiers compute the elements of the V matrix as $P(p_{n,m}=i_q|f_{n,m}f\sim_{n,m})$, that is the probably of the $n^{th}$ detected person 254 from the $m^{th}$ image has the identity of the $q^{th}$ person from the database of individuals of interest 114, given the features $f_{nm}$ associated with the $n^{th}$ detected person 254, and the (local) features $f_{\sim nm}$ associated with the other detected persons 254 from the $m^{th}$ image.

In one embodiment, the final likelihoods 610 are displayed on the display 332 for review by the user. For example, an image can be displayed and the final likelihoods associated with that image can be displayed. The user can then correct or confirm the final likelihoods 610 to improve the performance of the system by using the labeler 104. As another example, boxes can be shown on the display 332, drawn around each detected person 254. Then, a set of individual labels can be written in association with the box, where the set of individual labels is a list of names of individuals, sorted in order of the likelihood that the detected person 254 is that particular individual of interest. The user can then confirm the identity of the detected person 254 by selecting from the list the correct name, or by entering the correct name for the detected person, using the labeler 104. The likelihoods 616 are then updated based on the user-provided label input. In essence, when the user labels the detected person, then that column of the V matrix is updated so that the element associated with the correct individual of interest is 1.0, and all other elements are 0.0. 11. In this way, the likelihoods 616 are displayed to a user and the user provides input indicating the correctness of the labels. Then the likelihoods 616 are updated based on the user input.

Figure 3:
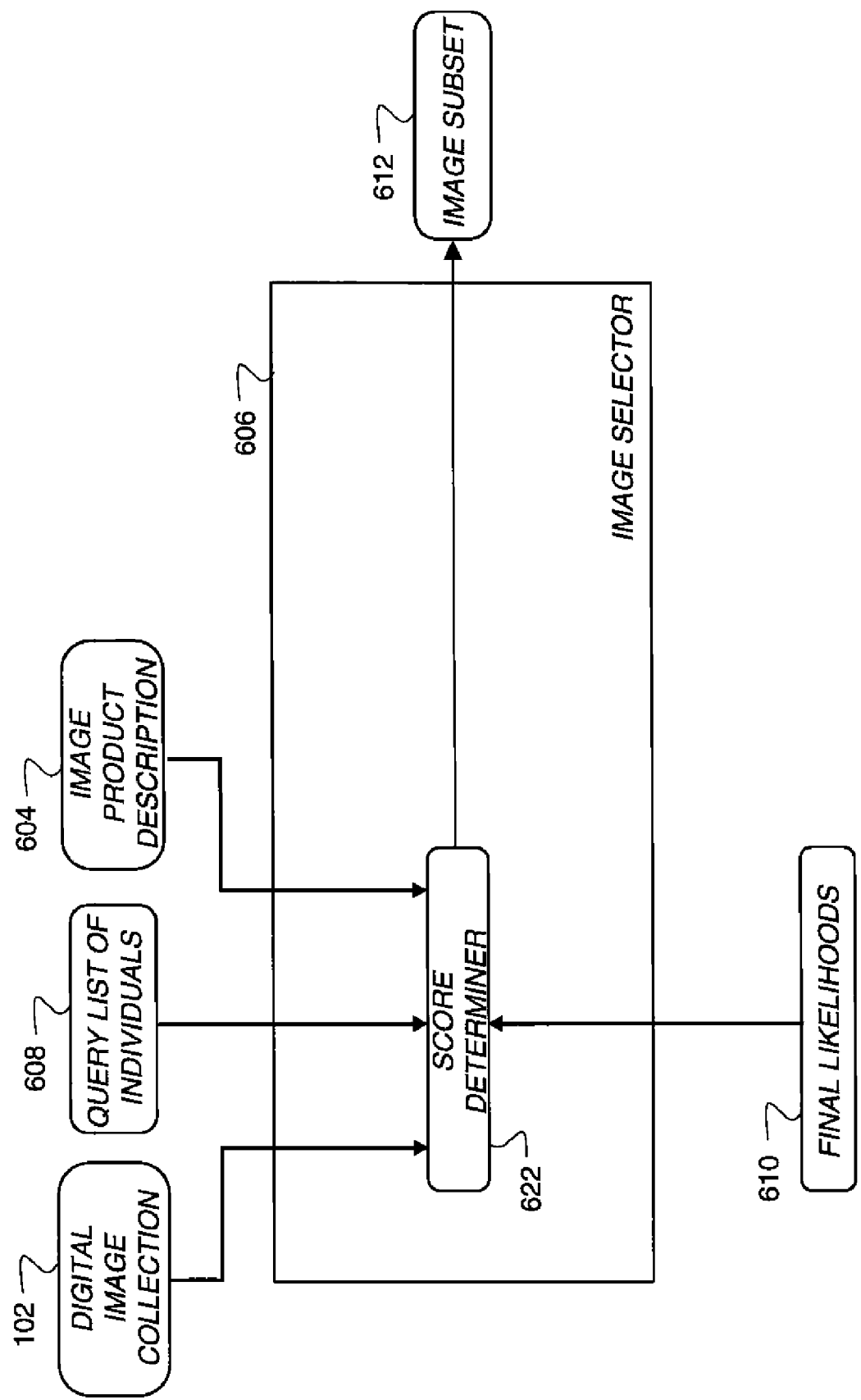
FIG. 3 shows a more detailed view of the image selector from FIG. 2.

The image selector 606 uses the final likelihoods 610 for the M images in the digital image collection 102 for selecting image subsets 612 that satisfy the requirements of the query list of individuals 608 and the image product description 604, as shown in more detail in FIG. 3. In essence, the action of the image selector 606 is to fulfill a query described by the image product description 604 and the query list of individuals 608. This query is unusual in that it requires more than one image to fulfill the query. For example, when the query is:

"Find the minimum number of images, such that they contain Jim, Bob, and Frank"

There may be no single image that fulfills the query requirement. However, the image collection contains one image of Jim and Bob, and a second image of Jim and Frank. These two images, taken together, fulfill the query.

Those skilled in the art will recognize that, while the present invention is described in the context of people recognition, this embodiment applies equally well to other searches that require cooperation between images to fulfill the query. For example, the query "Find 12 images that, taken together, contain at least one instance each of my 14 classic cars" can be used to make a calendar of a person's car collection. One of the fundamental differences in this type of query from a query for "my classic cars" is that the relationship between the content of each image in the returned set must be considered, i.e. a search for "my classic cars" does not achieve the user's objective of obtaining a set of 12 images where each of his 14 classic cars appears at least once in the collection.

The image selector 606 determines the image subset 612 by one of several methods.

In the first method called the greedy method, the final likelihoods 610 for each image from the digital image collection 102 are compared with the query information from the query list of individuals 608 and the image product description 604. Each image m receives a score $S_m$ from the score determiner 622 according to how much of the currently unsatisfied portion of the query is satisfied by that image:

$$S_m = \sum_{r=1}^{R} c_r P_m(l_r)$$

where $c_r$ is the aforementioned desired number of times the $r^{th}$ individual from the query list of individuals 608 should appear in the image subset 612, $l_r$ is the index identifier of the $r^{th}$ individual from the query list of individuals 608, and $P_m(l_r)$ is the probability that the $r^{th}$ individual from the query list of individuals 608 appears in the $m^{th}$ image from the digital image collection 102.

Those skilled in the art will appreciate that many variations to this scoring equation are possible. For example, the score can have a contribution from the aforementioned priority weight:

$$S_m = \sum_{r=1}^{R} c_r P_m(l_r) p_r$$

and/or the score can have a contribution from a quality factor related to the quality of appearance $q_{nm}$ of the $n^{th}$ detected person in the $m^{th}$ image from the digital image collection. The quality of appearance can be related to the sharpness, noisiness or other attributes affecting the overall quality of the image (such as described in U.S. Pat. No. 6,707,950, or the quality can be based on the appearance of the face (e.g. lower quality if eyes are closed (e.g. as detected in U.S Pat. No. 6,927,694, higher quality for large face size (e.g. >100 pixels between eye pupils), higher quality if the face is smiling, etc.) A scoring equation that takes the quality of the appearance into account is:

$$S_m = \sum_{r=1}^{R} \sum_{n=1}^{N} c_r P(p_{n,m} = i(l_r)) q_{nm}$$

The image m* having the highest score $S_m$ is selected and the query list of individuals is updated according to the following equation to determine the currently unsatisfied portion of the query:

$$c_{r,n+1} = c_{r,n} - P_{m^*}(l_r)$$

This process is iterated until the desired number of images is selected. The image subset 612 is then the collection of the selected images.

In an alternative embodiment, at each selection stage, the top $T_1$, (for example $T_1=3$) images having the highest score $S_m$ are selected. For updating the query list of individuals, the probabilities associated with the highest scoring image are used. Then, multiple subsets are generated by selecting one image from each stage. Finally, the multiple subsets are displayed on the display 332 to permit the user to select the best image subset. Additionally, the user can select a subset and then delete one or more images from the subset to produce a modified image subset 612. Furthermore, the user can add one or more images from the digital image collection 102 to an existing image subset 612, creating a new image subset.

In a further alternative embodiment, the image subset 612 can be generated by the image selector 606 with the following method:

For each of the r entries in the query composed of the query list of individuals and the image product description, a list of images is generated of those images with a high likelihood (e.g. likelihood greater than 0.8) of containing the $r^{th}$ individual of interest. Then, a random image subset is produced by randomly selecting a list, then an image within the list. This is repeated (eliminating lists that have been previously selected) until the random image subset contains the number of images specified in the image product description 604. The random image subset can then be given a score $W_s$ by a score determiner 622 related to the probability that it satisfies the query. Many random subsets are generated. Then the image subsets having the top scores (e.g. the top 5 scores) are displayed to the user to permit selection of the preferred subset.

In an alternative embodiment, an image subset is shown to the user. Images within the subset can be replaced with other images from the digital image collection 102. An image from the image subset is selected and images that can be substituted for that image are shown. The images that can be substituted for a selected image are found by determining which images from the image collection 102 will have the smallest effect on the overall image subset score.

Figure 4:
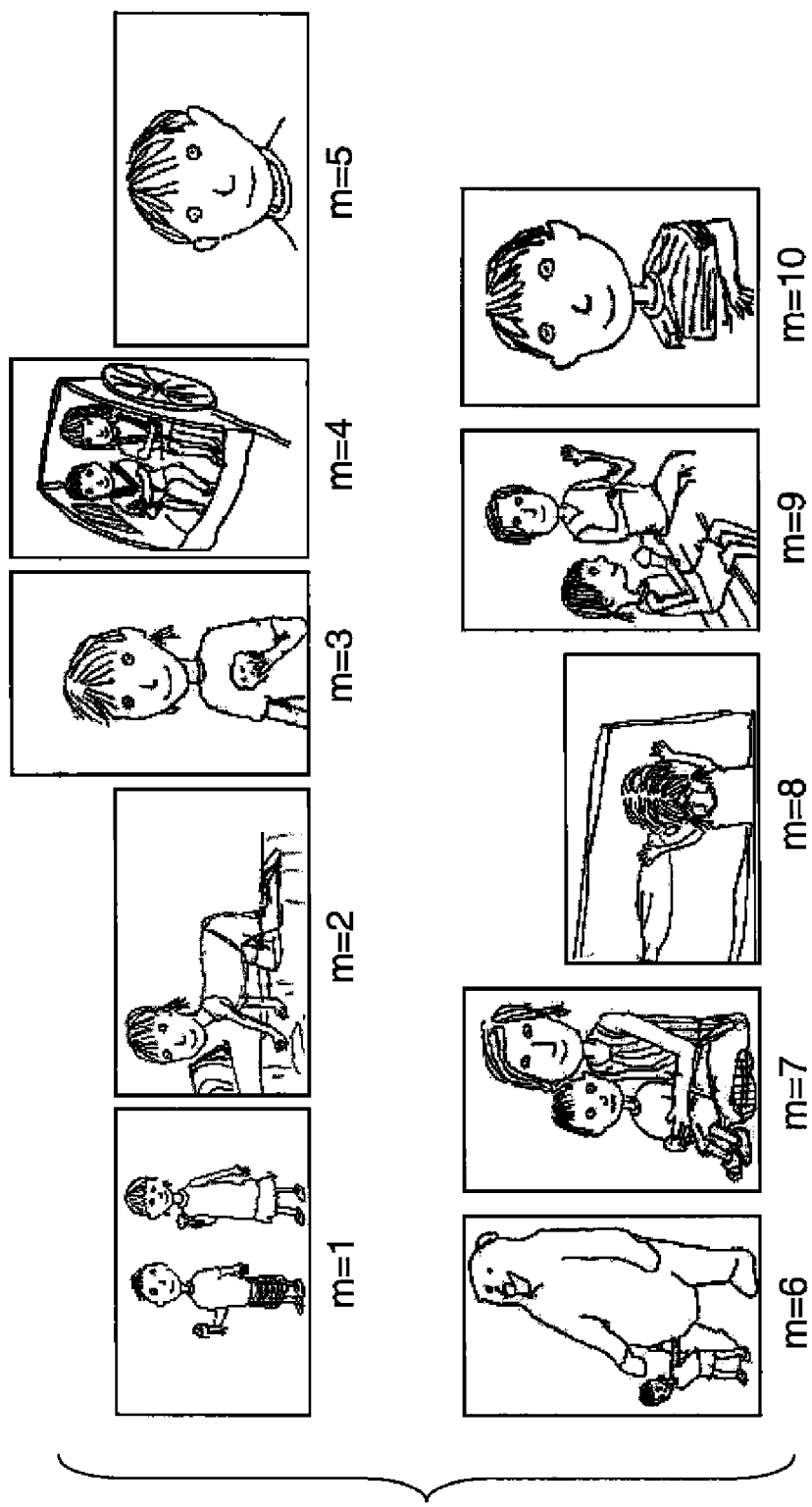
FIG. 4 shows a representative set of 10 images from a digital image collection.

For example, FIG. 4 shows a representation of 10 images of a digital image collection 102 numbered m=1 to m=10. Assuming that the final likelihoods are perfect (for illustration) yields the following table (Table 1) of final likelihoods:

TABLE 1

Final Likelihoods

| Image number m | P(i1) | P(i2) | P(i3) |
|---|---|---|---|
| 1 | 1 | 1 | 0 |
| 2 | 1 | 0 | 0 |
| 3 | 1 | 0 | 0 |
| 4 | 1 | 1 | 0 |
| 5 | 0 | 1 | 0 |
| 6 | 1 | 0 | 0 |
| 7 | 0 | 1 | 1 |
| 8 | 1 | 0 | 0 |
| 9 | 1 | 0 | 1 |
| 10 | 0 | 1 | 0 |

The query is to find two images that together contain individuals 1, 2 and 3. This query can be satisfied by 11 different image subsets:

Images 1 and 7
Images 1 and 9
Images 2 and 7
Images 3 and 7
Images 4 and 7
Images 4 and 9
Images 5 and 9
Images 6 and 7
Images 7 and 8
Images 7 and 9
Images 9 and 10

Because the final likelihoods are perfect, the score $W_s$ for each of these 11 image subsets is a likelihood of 1.0 that the subset satisfies the query.

Figure 5:
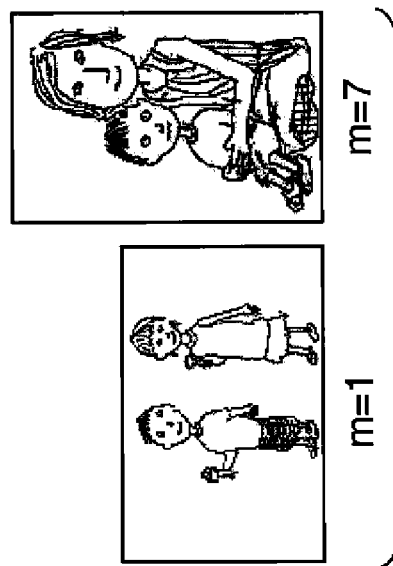
FIG. 5 shows a representative subset of images displayed to the user as a result of searching for a query list of individuals.
Figure 6:
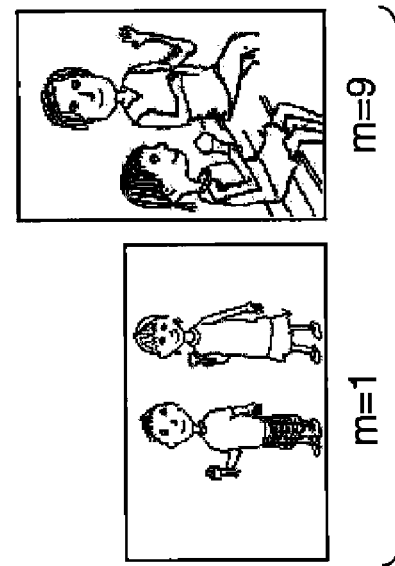
FIG. 6 shows an alternative subset of images displayed to the user after the user replaced on of the images from the subset shown in FIG. 5.

All of these image subsets can be shown to the user to permit selection of the image subset to be used for creating the image product 602. Or as described above and now illustrated in FIG. 5, the highest ranking subset can be shown the user. The user can then see the alternate image subsets by selecting one image to replace. For example, the user can select to replace image m=7. The new subset is shown in FIG. 6. When there is more than one image from the digital image collection 102 that can be used to replace the selected image, the user can choose from a list of thumbnail images. Of course, in an actual system the highest ranking subset may not actually satisfy the query and the user can browse through lower ranked subsets to find one or more that do a better job at satisfying the query.

Now suppose the final probabilities contain realistic uncertainty, as shown in Table 2:

TABLE 2

Final Probabilities with Uncertainty

| Image number m | P(i$_1$) | P(i$_2$) | P(i$_3$) | P(i$_2$, i$_3$) | P(i$_1$, i$_3$) | P(i$_1$, i$_2$) |
|---|---|---|---|---|---|---|
| 1 | 0 | 0 | 0 | 0.1 | 0.1 | 0.8 |
| 2 | 0.9 | 0.1 | 0 | 0 | 0 | 0 |

TABLE 2-continued

Final Probabilities with Uncertainty

| Image number m | P(i$_1$) | P(i$_2$) | P(i$_3$) | P(i$_2$, i$_3$) | P(i$_1$, i$_3$) | P(i$_1$, i$_2$) |
|---|---|---|---|---|---|---|
| 3 | 1 | 0 | 0 | 0 | 0 | 0 |
| 4 | 0 | 0 | 0 | 0 | 0.25 | 0.75 |
| 5 | 0 | 1 | 0 | 0 | 0 | 0 |
| 6 | 0.6 | 0.3 | 0.1 | 0 | 0 | 0 |
| 7 | 0 | 0 | 0 | 0.6 | 0.3 | 0.1 |
| 8 | 0.8 | 0.2 | 0 | 0 | 0 | 0 |
| 9 | 0 | 0 | 0 | 0.25 | 0.5 | 0.25 |
| 10 | 0 | 0.7 | 0.3 | 0 | 0 | 0 |

The table can still contain probabilities of 1.0 either from having very high scores from the classifier, or because the images have been labeled explicitly as containing the individual of interest.

Then the following image subsets have the highest scores:

image 4 and image 7 Score $W_s$=0.85
image 1 and image 7 Score $W_s$=0.83
image 1 and image 9 Score $W_s$=0.73
image 7 and image 9 Score $W_s$=0.68
image 4 and image 9 Score $W_s$=0.63
image 2 and image 7 Score $W_s$=0.57

Figure 7:
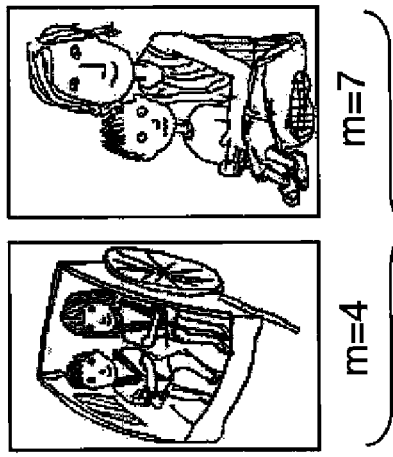
FIG. 7 shows a representative subset of images displayed to the user as a result of searching for a query list of individuals.
Figure 8:
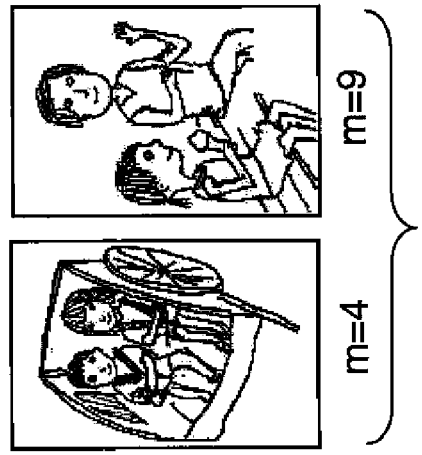
FIG. 8 shows an alternative subset of images displayed to the user after the user replaced on of the images from the subset shown in FIG. 7.

FIG. 7 shows the image subset (images 4 and 7) having the highest score (probability of fulfilling the query) based on the final likelihoods. (This subset does in fact fulfill the query correctly.) If the user chooses to see the next highest subset, then that image subset is images 1 and 7, shown in FIG. 5. If the user chooses to replace image m=4, then the next highest subset containing all of the other images (i.e. image 7) is composed of images 1 and 7, and is shown in FIG. 5. If the user chooses to replace image m=7, then the next image subset is images 4 and 9, and is shown in FIG. 8.

When the image product description 604 requires that the query is fulfilled using the fewest number of images possible, then a series of image subsets 612 can be considered. The smallest (in terms of number of images) image subset having a score $W_s$ exceeding a threshold $T_2$ (e.g. $T_2$>0.8) is selected as the image subset 612.

FIG. 9 is a flow diagram showing a method for using a digital camera to label images. Those skilled in the art will recognize that the processing platform for using the present invention can be a camera, a personal computer, a remote computer accessed over a network such as the Internet, a printer, or the like. In this embodiment, a user selects a one or more images or videos containing a person of interest, and the system determines and displays images or videos from a subset of the digital image collection believed to contain the person of interest. The displayed images can be reviewed by the user, and the user can indicate whether the displayed images do contain the person of interest. In addition, the user can verify or provide the name of the person of interest. Finally, based on the input from the user, the system can again determine a set of images believed to contain the person of interest.

The labels generated by the labeler 104 are associated with features extracted by the feature extractor.

In block 202, images are displayed on the display 332. In block 204, the user selects images, where each image contains the person of interest. For example, FIG. 5 shows a set of two selected images, each containing the person of interest (the boy, individual 2). In block 206, the user provides a label via the labeler 104 that indicates the selected images contain the person of interest and the images and videos from the image collection are to be searched by the person finder 108 to identify those believed to contain the person of interest. In block 208, the labeler 104 stores the label along with features associated with the persons in the database of individuals of interest 114.

Note that the person of interest and images or videos can be selected by any user interface known in the art. For example, if the display 332 is a touch sensitive display, then the approximate location of the person of interest can be found by determining the location that the user touches the display 332.

Figure 10:
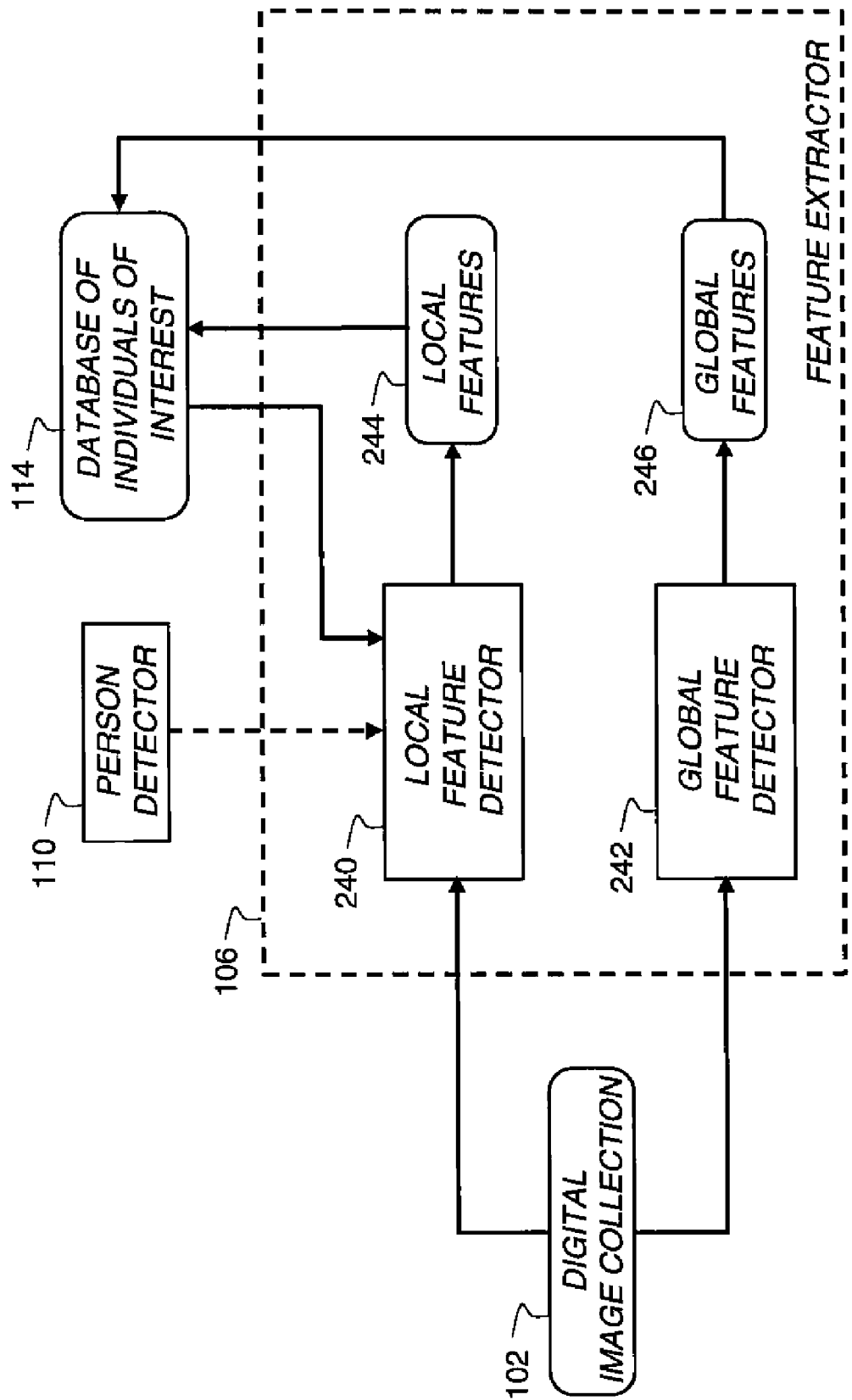
FIG. 10 shows a more detailed view of the feature extractor from FIG. 2.

FIG. 10 describes the feature extractor 106 from FIG. 2 in greater detail. The feature extractor 106 determines features related to people from images and videos in the digital image collection. These features are then used by the image selector 606 to find images or videos in the digital image collection believed to contain individuals from the query list of individuals 608 to satisfy the query. The feature extractor 106 determines two types of features related to people. A global feature detector 242 determines global features 246. A global feature 246 is a feature that is independent of the identity or position of the individual in an image of video. For example, the identity of the photographer is a global feature because the photographer's identity is constant no matter how many people are in an image or video and is likewise independent of the position and identities of the people.

Additional global features 246 include:

Image/video file name.

Image/video capture time. Image capture time can be a precise minute in time, e.g. Dec. 7, 2005 at 12:12 PM. Or the image capture time can be less precise, e.g. 2005 or December 2005. The image capture time can be in the form of a probability distribution function e.g. Mar. 27, 2004+/−2 days with 95% confidence. Often times the capture time is embedded in the file header of the digital image or video. For example, the EXIF image format (described at www.exif.org) permits the image or video capture device to store information associated with the image or video in the file header. The "Date\Time" entry is associated with the date and time the image was captured. In some cases, the digital image or video results from scanning film and the image capture time is determined by detection of the date printed into the image (as is often done at capture time) area, usually in the lower left corner of the image. The date a photograph is printed is often printed on the back of the print. Alternatively, some film systems contain a magnetic layer in the film for storing information such as the capture date.

Capture condition metadata (e.g. flash fire information, shutter speed, aperture, ISO, scene brightness, etc.)

Geographic location. The location is preferably stored in units of latitude and longitude.

Scene environment information. Scene environment information is information derived from the pixel values of an image or video in regions not containing a person. For example, the mean value of the non-people regions in an image or video is an example of scene environment information. Another example of scene environment information is texture samples (e.g. a sampling of pixel values from a region of wallpaper in an image).

Geographic location and scene environment information are important clues to the identity of persons in the associated images. For example, a photographer's visit to grandmother's house could be the only location where grandmother is photographed. When two images are captured with similar geographic locations and environments, it is more likely that detected persons in the two images are the same as well.

Scene environment information can be used by the person detector 110 to register two images. This is useful when the people being photographed are mostly stationary, but the camera moves slightly between consecutive photographs. The scene environment information is used to register the two images, thereby aligning the positions of the people in the two frames. This alignment is used by the person finder 108 because when two persons have the same position in two images captured closely in time and registered, then the likelihood that the two people are the same individual is high.

A local feature detector 240 computes local features 244. Local features are features directly relating to the appearance of a person in an image or video. Computation of these features for a person in an image or video requires knowledge of the position of the person. The local feature detector 240 is passed information related to the position of a person in an image of video from either the person detector 110, or the database 114, or both. The person detector 110 can be a manual operation where a user inputs the position of people in images and videos by outlining the people, indicating eye position, or the like. Preferable, the person detector 110 implements a face detection algorithm. Methods for detecting human faces are well known in the art of digital image processing. For example, a face detection method for finding human faces in images is described in the following article: Jones, M. J.; Viola, P., "Fast Multi-view Face Detection", *IEEE Conference on Computer Vision and Pattern Recognition* (CVPR), June 2003.

Figure 11:
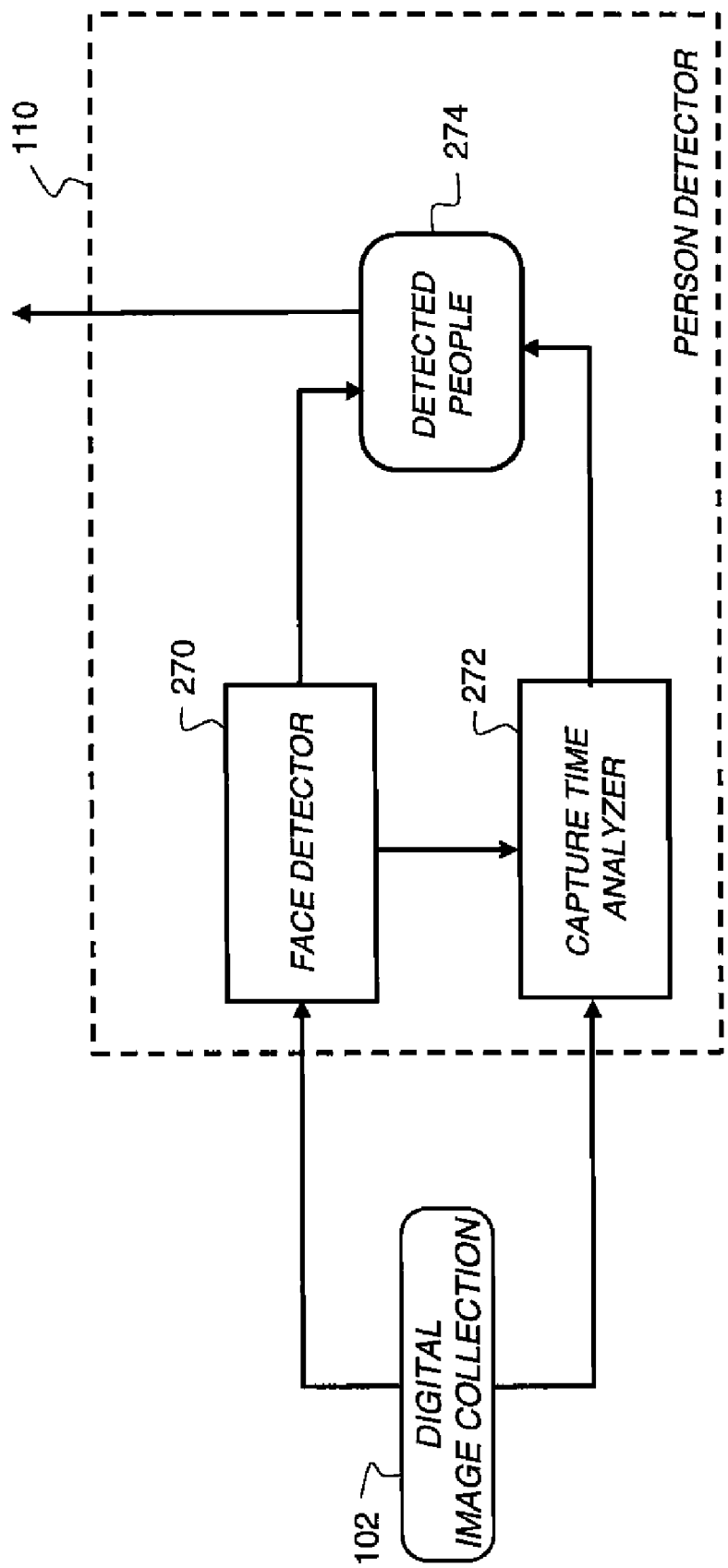
FIG. 11 shows a more detailed view of the person detector from FIG. 2.

An effective person detector 110 is based on the image capture time associated with digital images and videos is described with regard to FIG. 11. The images and videos of the digital image collection 102 are analyzed by a face detector 270, such as the aforementioned face detector by Jones and Viola. The face detector is tuned to provide detected people 274 while reducing the number of false detections. As a consequence, many people in images are not detected. This can be a consequence of, for example, having their back to the camera, or a hand over the face. The detected faces from the face detector 270 and the digital image collection 102 are passed to a capture time analyzer 272 to find images containing people that were missed by the face detector 270. The capture time analyzer 272 operates on the idea that, when two images are captured very close in time, it is likely that if an individual appears in one image, then he or she also appears in the other image as well. In fact, this relationship can be determined with fairly good accuracy by analyzing large collections of images when the identities of persons in the images are known. For processing videos, face tracking technology is used to find the position of a person across frames of the video. One method of face tracking is video is described in U.S. Pat. No. 6,700,999, where motion analysis is used to track faces in video.

Figure 12:
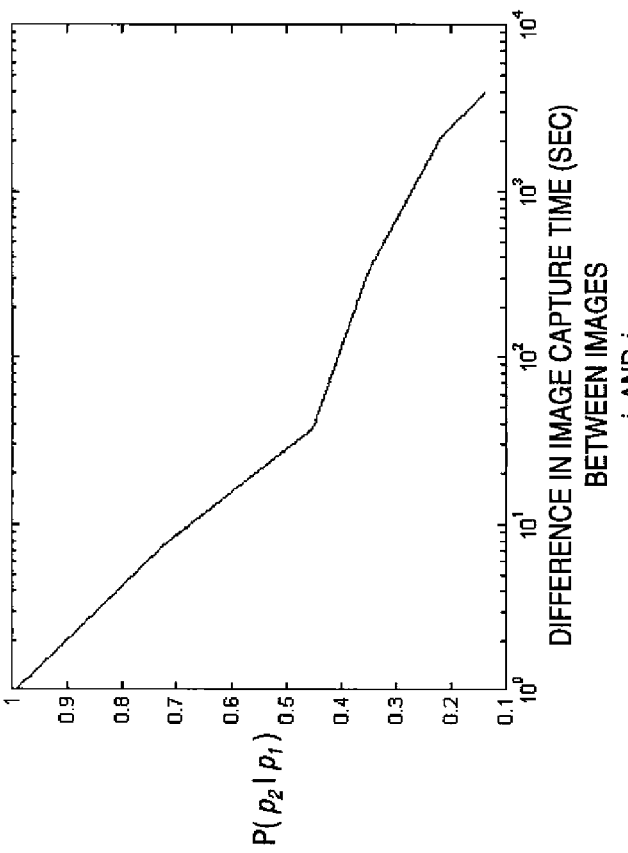
FIG. 12 is a plot of the relationship of the difference in image capture times and the probability that a person who appeared in one image will also appear in the second image.

FIG. 12 shows a plot of the relationship used by the capture time analyzer 272. The plot shows the probability of a person appearing in a second image, given that the person appeared in a first image, as a function of the difference in image capture time between the images. As expected, when two images are captured in rapid succession, the likelihood that a person appears in one image and not the other is very low.

The capture time analyzer 272 examines images and videos in the digital image collection 110. When a face is detected by the face detector 270 in a given image, then the probability that that same person appears in another image is calculated using the relationship shown in FIG. 12B.

Figure 13:
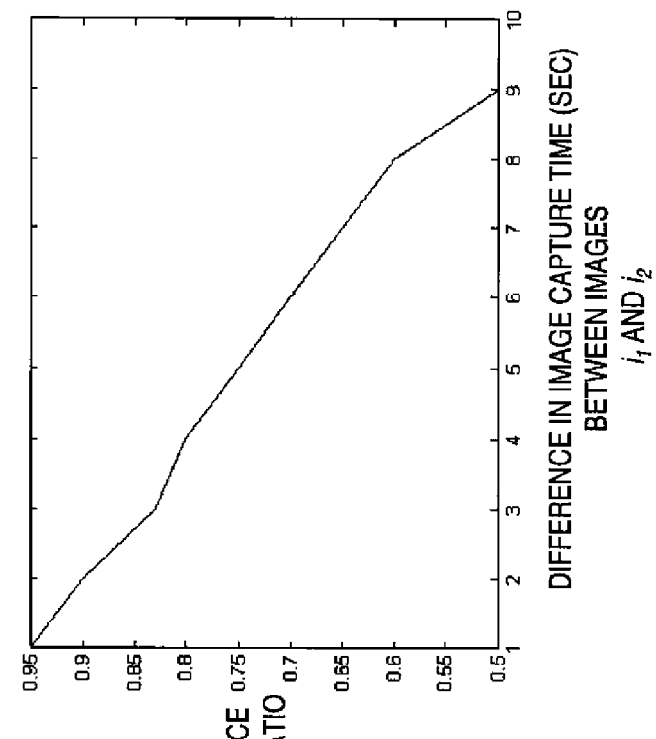
FIG. 13 is a plot of the relationship of face size ratio as a function of difference in image capture times.

For example, assume that the face detector 270 detected two faces in one image, and a second image, captured only 1 second later, the face detector 270 found only one face. Assuming that the detected faces from the first image are true positives, the probability is quite high (0.99*0.99) that the second image also contains two faces, but only one found by the face detector 270. Then, the detected people 274 for the second image are the one face found by the face detector 270, and second face with confidence 0.98. The position of the second face is not known, but can be estimated because, when the capture time difference is small, neither the camera nor the people being photographed tend to move quickly. Therefore, the position of the second face in the second image is estimated by the capture time analyzer 272. For example, when an individual appears in two images, the relative face size (the ration of the size of the smaller face to the larger face) can be examined. When the capture times of two images containing the same person is small, the relative face size usually falls near 1, because the photographer, and the person being photographed and the camera settings are nearly constant. A lower limit of the relative face size is plotted as a function of difference in image capture times in FIG. 13. This scaling factor can be used in conjunction with the known face position of a face in a first image to estimate a region wherein the face appears in the second image.

Note that the method used by the capture time analyzer 272 can also be used to determine the likelihood that a person of interest in is a particular image or video by the person finder 108.

Also, the database 114 stores information associated with labels from the labeler 104 of FIG. 2. When the label contains position information associated with the person, the local feature detector 240 can determine local features 244 associated with the person.

Once the position of a person is known, the local feature detector 240 can detect local features 244 associated with the person. Once a face position is known, the facial features (e.g. eyes, nose, mouth, etc.) can also be localized using well known methods such as described by Yuille et al. in, "Feature Extraction from Faces Using Deformable Templates," *Int. Journal of Comp. Vis.*, Vol. 8, Iss. 2, 1992, pp. 99-111. The authors describe a method of using energy minimization with template matching for locating the mouth, eye and iris/sclera boundary. Facial features can also be found using active appearance models as described by T. F. Cootes and C. J. Taylor "Constrained active appearance models", 8*th International Conference on Computer Vision*, volume 1, pages 748-754. IEEE Computer Society Press, July 2001. In the preferred embodiment, the method of locating facial feature points based on an active shape model of human faces described in "An automatic facial feature finding system for portrait images", by Bolin and Chen in the Proceedings of IS&T PICS conference, 2002 is used.

Figure 14:
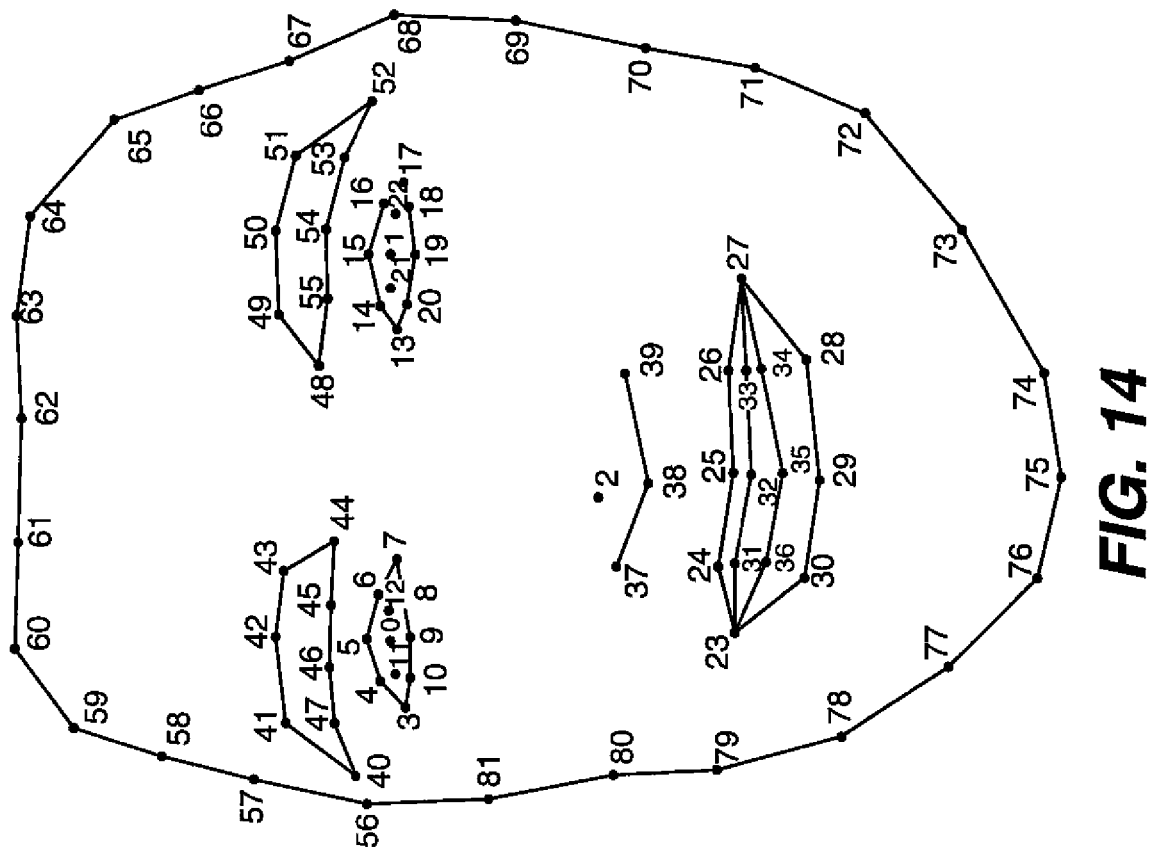
FIG. 14 is a representation of feature points extracted from a face by the feature extractor of FIG. 2.

The local features 244 are quantitative descriptions of a person. Preferably, the person finder feature extractor 106 outputs one set of local features 244 and one set of global features 246 for each detected person. Preferably the local features 244 are based on the locations of 82 feature points associated with specific facial features, found using a method similar to the aforementioned active appearance model of Cootes et al. A visual representation of the local feature points for an image of a face is shown in FIG. 14 as an illustration. The local features can also be distances between specific feature points or angles formed by lines connecting sets of specific feature points, or coefficients of projecting the feature points onto principal components that describe the variability in facial appearance. A good set of features can be obtained by determining the principle components of the facial feature points by gathering the feature point locations from a large number of images of people. Then each principle component describes a variation of a particular set of facial feature points from the average set of facial feature points. Some of these principle components relate to changes in expression or pose, while others relate to differences in appearance between unique individuals. A good set of features is obtained by projecting a set of feature points onto the principle components that related to the differences in appearance between unique individuals and ignoring the other principle components.

Color cues are easily extracted from the digital image or video once the person and facial features are located by the person finder 106.

Alternatively, different local features can also be used. For example, an embodiment can be based upon the facial similarity metric described by M. Turk and A. Pentland. In "Eigenfaces for Recognition", *Journal of Cognitive Neuroscience.* Vol. 3, No. 1. 71-86, 1991. Facial descriptors are obtained by projecting the image of a face onto a set of principal component functions that describe the variability of facial appearance. The similarity between any two faces is measured by computing the Euclidean distance of the features obtained by projecting each face onto the same set of functions.

The local features 244 could include a combination of several disparate feature types such as Eigenfaces, facial measurements, color/texture information, wavelet features etc.

Alternatively, the local features 244 can additionally be represented with quantifiable descriptors such as eye color, skin color, face shape, presence of eyeglasses, description of clothing, description of hair, etc.

For example, Wiskott describes a method for detecting the presence of eyeglasses on a face in "Phantom Faces for Face Analysis", *Pattern Recognition*, Vol. 30, No. 6, pp. 837-846, 1997. The local features contain information related to the presence and shape of glasses.

Again referring to FIG. 10, the global features 246 and local features 244 are stored in the database of individuals of interest 114. Global features associated with all people in an image are represented by $F_G$. The N sets of local features associated with the N people in an image are represented as $F_{L0}, F_{L1}, \ldots, F_{LN-1}$. The complete set of features for a person n in the image is represented as $F_n$ and includes the global features $F_G$ and the local features $F_{Ln}$. The M labels associated with the image are represented as $L_0, L_1, \ldots, L_{M-1}$. When the label does not include the position of the person, there is ambiguity in knowing which label is associated with which set of features representing persons in the image or video. For example, when there are two sets of features describing two people in an image and two labels, it is not obvious which features belongs with which label. The person finder 108 solves this constrained classification problem of matching labels with sets of local features, where the labels and the local features are associated with a single image. There can be any number of labels and local features, and even a different number of each.

Figure 15:
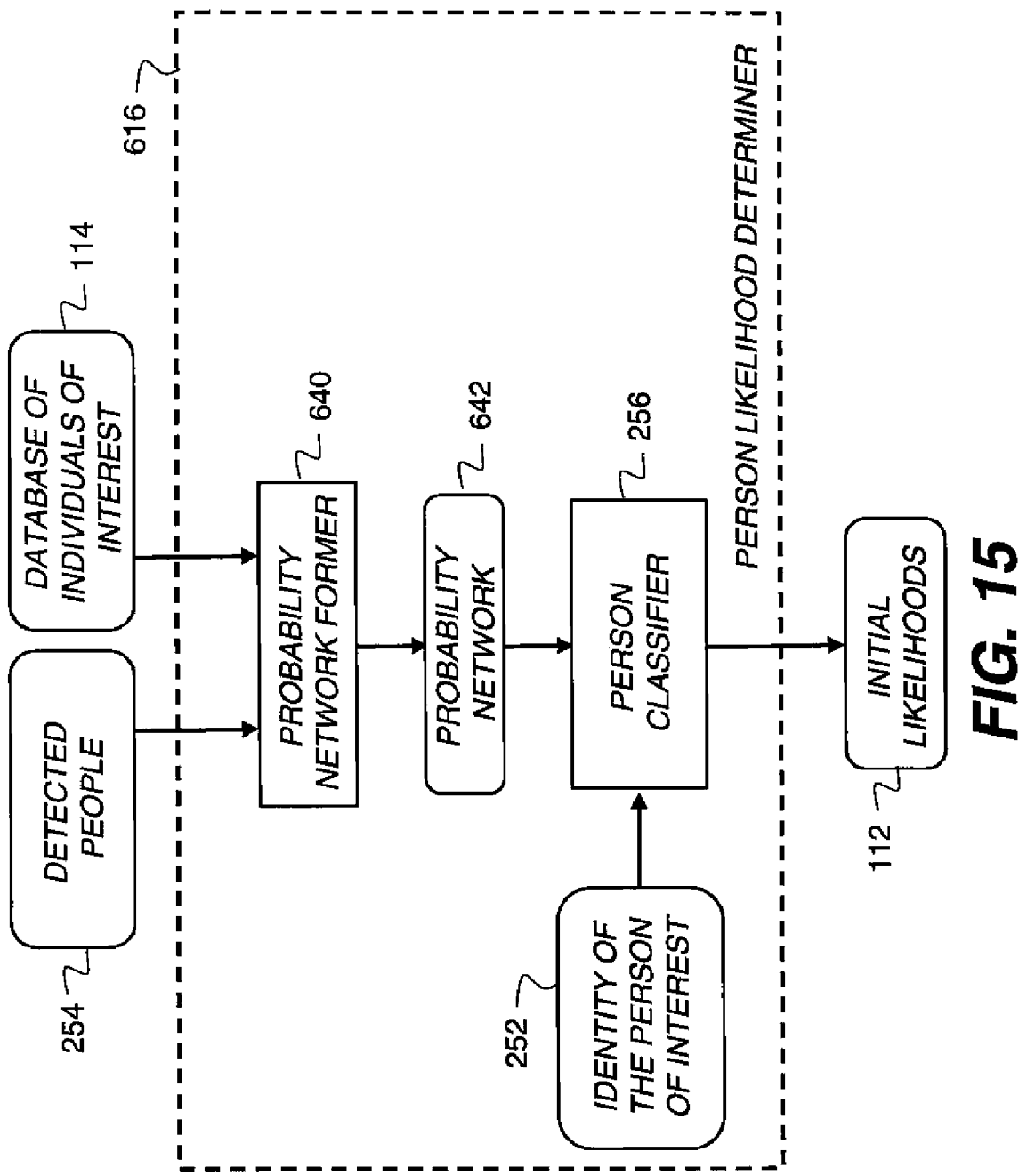
FIG. 15 shows a more detailed view of the person likelihood determiner of FIG. 2.

Here is an example entry of labels and features associated with an image in the database 114:

Image 101_346.JPG
Label $L_0$: Hannah
Label $L_1$: Jonah
Features $F_0$:
    Global Features $F_G$:
        Capture Time: Aug. 7, 2005, 6:41 PM EST.
        Flash Fire: No
        Shutter Speed: 1/724 sec.
        Camera Model: Kodak C360 Zoom Digital Camera
        Aperture: F/2.7
        Environment:
    Local Features $F_{L0}$:

Position: Left Eye: [1400 198] Right Eye: [1548 202]
$C_0$=[−0.8, −0.01]';
Glasses: none
Associated Label: Unknown
Features $F_1$:
Global Features $F_G$:
Capture Time: Aug. 7, 2005, 6:41 PM EST.
Flash Fire: No
Shutter Speed: 1/724 sec.
Camera Model: Kodak C360 Zoom Digital Camera
Aperture: F/2.7
Environment:
Local Features: $F_{L1}$:
Position: Left Eye: [810 192] Right Eye: [956 190]
$C_1$=[0.06, 0.26]';
Glasses: none
Associated Label: Unknown The person likelihood determiner 616 uses features associated with the detected people 254 and the features and associated labels in the database of individuals of interest 114 to determine the initial likelihoods V, as previously describes. The features associated with the detected people 254 include some features having associated labels (known as labeled features) in the database of individuals of interest 114. Other features (known as unlabeled features) do not have associated labels (e.g. all of the image and videos in the digital image collection 102 that were not labeled by the labeler 104). The person likelihood determiner 616 uses labeled features to classify the unlabeled features. This problem, although in practice quite difficult, is studied in the field of pattern recognition. Any of a number of classifiers can by used to classify the unlabeled features. Preferably, the person classifier determines the probability $P(p_{n,m}=i_q)$ In general, classifiers assign labels based on probability to unlabeled featured by considering the similarity between a particular set of unlabeled features and labeled sets of features. With some classifiers (e.g. Gaussian Maximum Likelihood), labeled sets of features associated with a single individual person are aggregated to form a model of appearance for the individual. The person likelihood determiner 616 is shown in more detail in FIG. 15.

A person classifier 256 can measure the similarity between sets of features associated with two or more persons to determine the similarity of the persons, and thereby the likelihood that the persons are the same. Measuring the similarity of sets of features is accomplished by measuring the similarity of subsets of the features. For example, when the local features describe clothing, the following method is used to compare two sets of features. If the difference in image capture time is small (i.e. less than a few hours) and if the quantitative description of the clothing is similar in each of the two sets of features is similar, then the likelihood of the two sets of local features belonging to the same person is increased. If, additionally, the clothes have a very unique or distinctive pattern (e.g. a shirt of large green, red, and blue patches) for both sets of local features, then the likelihood is even greater that the associated people are the same individual.

Figure 16:
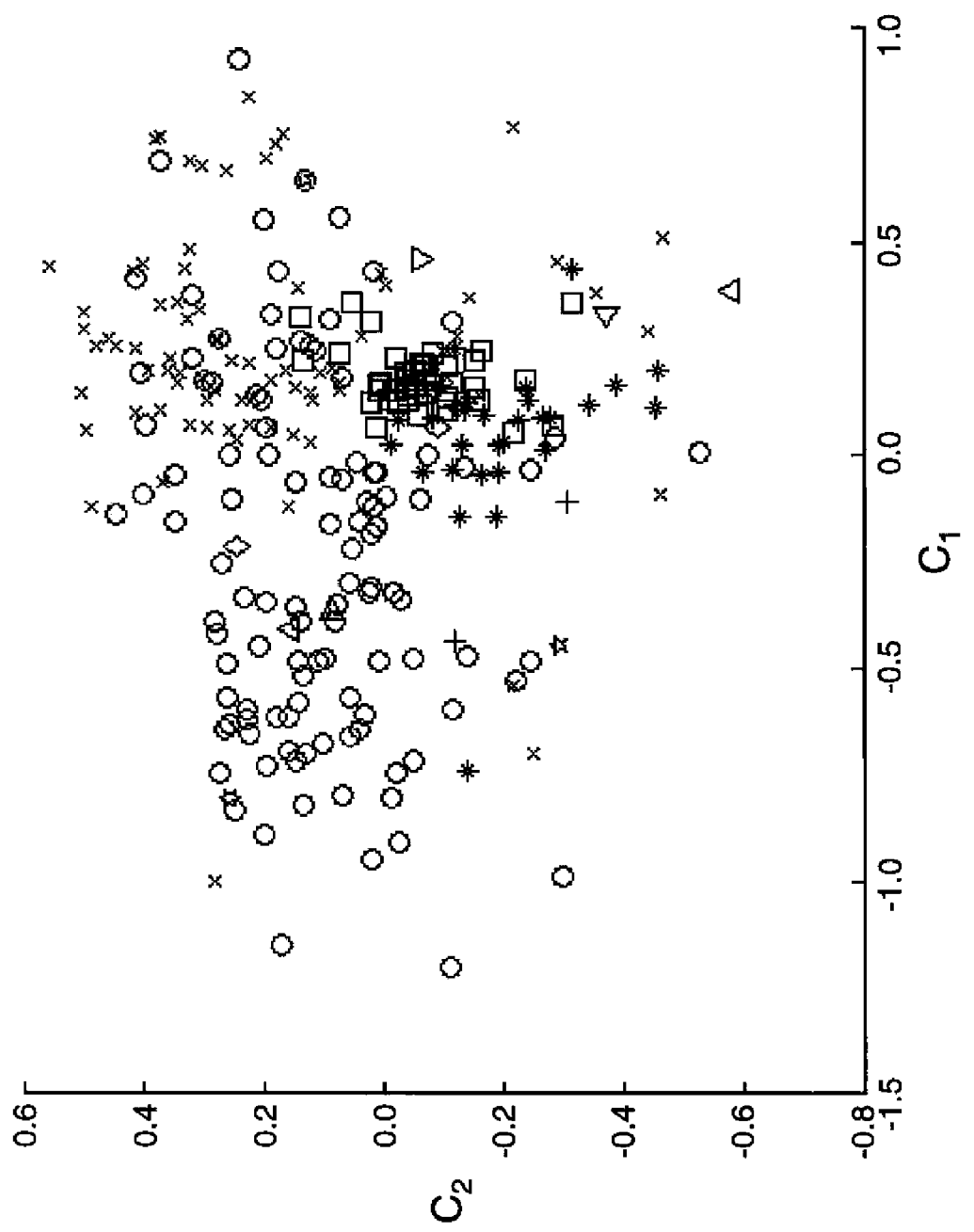
FIG. 16 shows a plot of local features for 299 faces, and the actual identities of the faces.

To determine the initial likelihoods 112, the person classifier 256 uses a probability network 642 generated by the probability network former 640. FIG. 16 shows a plot of two features ($C_1$ and $C_2$) computed for 299 faces from a digital image collection 102. These features are derived as previously mentioned by projecting facial feature points to the principle components and ignoring components associated with pose or expression. Different symbols represent different individuals (known by ground truth. The true identity of most features would not be known to the person likelihood determiner 616.)

Figure 17:
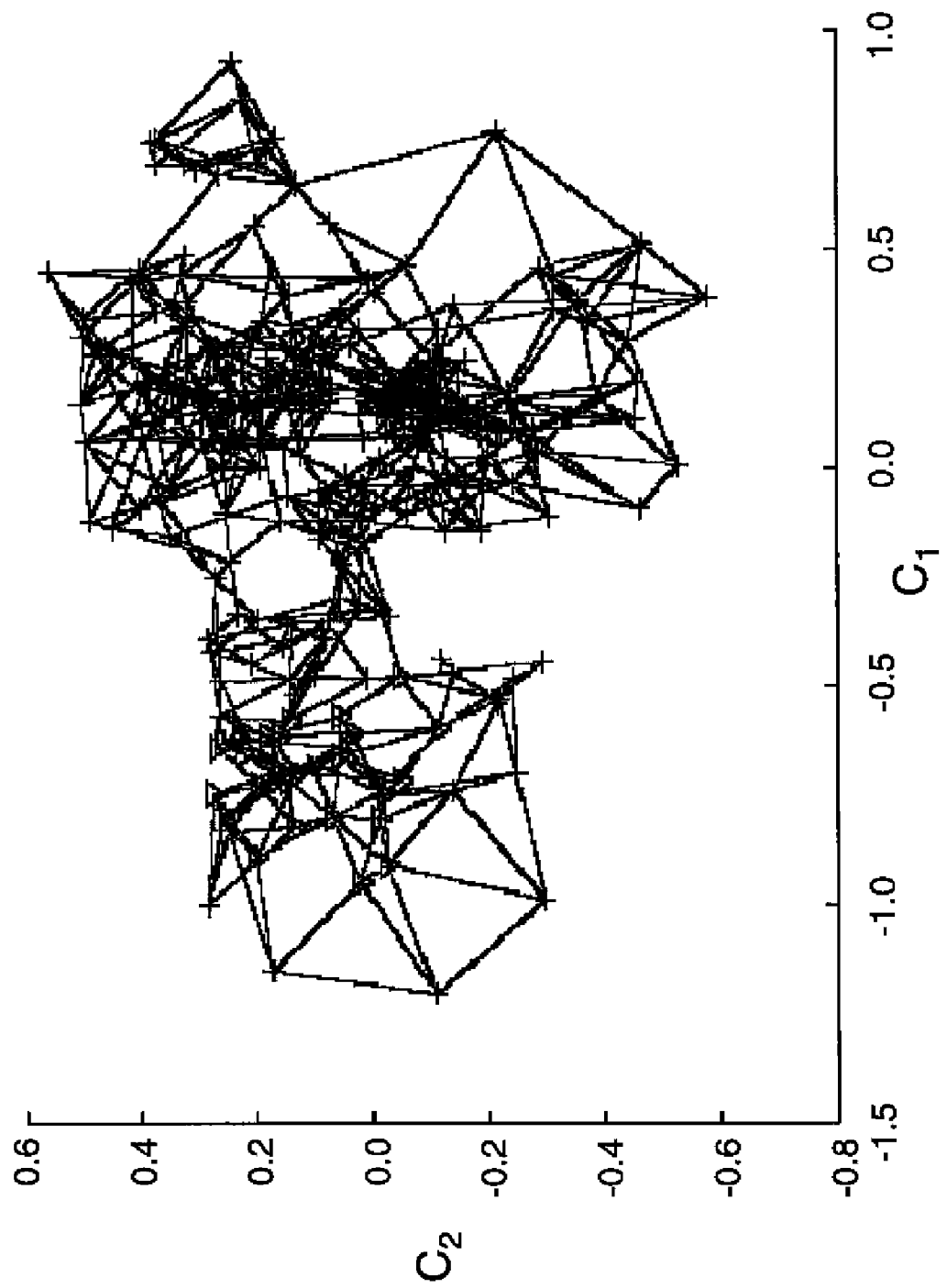
FIG. 17 shows a probability network formed from the local features of 299 faces.

The probability network former 640 forms a probability network 642 by establishing links between the points (also called nodes) (which represent features associated with detected people.) FIG. 17 shows an established probability network 642 formed by linking each point to its 5 nearest neighbors. The implicit assumption is that the identity of a person is likely to be the same as the identity of another person when the two share similar features. Each link has an associated probability weight $w_{ij}$ (where i and j represent the indices of the first and second people joined by the link. Each person (e.g. the $n^{th}$ person from the $m^{th}$ image in the digital image collection 102) is assigned a global index) indicating the likelihood that the two sets of features joined by the link have the same identity. The weights are established based on learning, from a large number of labeled feature sets, the likelihood that two people are the same individual based on the distance between their features. The probability network 642 is composed of the links and weights between feature points.

Some of the feature points have associated labels. These labels are propagated through the probability network 642, classifying the unlabeled feature points using the person classifier 256. The propagation proceeds as follows: If the identity of the $i^{th}$ person (the identity of the person of interest 252) is known to be individual of interest q with probability p, then that belief is propagated through the probability network 642 according to the weights $w_{ij}$. The $j^{th}$ feature point then has belief of $pw_{ij}$ that its identity is q. In turn, this belief can be propagated to its neighbors by multiplying by the appropriate weights. When multiple beliefs associated with a single individual arrive at a single point, only the maximum value belief is preserved. There exists many methods for propagating beliefs on a network, and many of these variations can be used. For example, Markov random fields can be used.

FIG. 17 shows an example of the propagation of beliefs across the probability network 642. The star shows a point with an assigned label (i.e. 100% likelihood that the identity of that person is $q_1$.) The probability network 642 then shows all the points (29 triangles and 1 square) that end up with a probability of being individual $q_1$ with >50% likelihood. Of these, the triangles indicate all the points which are actually individual $q_1$, and the square indicates a point that is not individual $q_1$.

Clothing can be represented numerically in many different ways. The color and texture representations and similarity described in U.S. Pat. No. 6,480,840 by Zhu and Mehrotra is one possible way. In another possible representation, Zhu and Mehrotra describe a method specifically intended for representing and matching patterns such as those found in textiles in U.S. Pat. No. 6,584,465. This method is color invariant and uses histograms of edge directions as features. Alternatively, features derived from the edge maps or Fourier transform coefficients of the clothing patch images can be used as features for matching. Before computing edge-based or Fourier-based features, the patches are normalized to the same size to make the frequency of edges invariant to distance of the subject from the camera/zoom. A multiplicative factor is computed which transforms the inter-ocular distance of a detected face to a standard inter-ocular distance. Since the patch size is computed from the inter-ocular distance, the clothing patch is then sub-sampled or expanded by this factor to correspond to the standard-sized face.

A uniqueness measure is computed for each clothing pattern that determines the contribution of a match or mismatch to the overall match score for persons, as shown in Table 5, where + indicates a positive contribution and − indicates a negative contribution, with the number of + or − used to indicate the strength of the contribution. The uniqueness score is computed as the sum of uniqueness of the pattern and the uniqueness of the color. The uniqueness of the pattern is proportional to the number of Fourier coefficients above a threshold in the Fourier transform of the patch. For example, a plain patch and a patch with single equally spaced stripes have 1 (dc only) and 2 coefficients respectively, and thus have low uniqueness score. The more complex the pattern, the higher the number of coefficients that will be needed to describe it, and the higher its uniqueness score. The uniqueness of color is measured by learning, from a large database of images of people, the likelihood that a particular color occurs in clothing. For example, the likelihood of a person wearing a white shirt is much greater than the likelihood of a person wearing an orange and green shirt. Alternatively, in the absence of reliable likelihood statistics, the color uniqueness is based on its saturation, since saturated colors are both rarer and also can be matched with less ambiguity. In this manner, clothing similarity or dissimilarity, as well as the uniqueness of the clothing, taken with the capture time of the images are important features for the person classifier 256 to recognize a person of interest.

Clothing uniqueness is measured by learning, from a large database of images of people, the likelihood that particular clothing appears. For example, the likelihood of a person wearing a white shirt is much greater than the likelihood of a person wearing an orange and green plaid shirt. In this manner, clothing similarity or dissimilarity, as well as the uniqueness of the clothing, taken with the capture time of the images are important features for the person classifier 256 to recognize a person of interest.

TABLE 3

The effect of clothing on likelihood of two people being the same individual

| Time Interval | | Clothing Uniqueness | |
|---|---|---|---|
| | | common | rare |
| Same event | Match | ++ | +++ |
| | Not Match | --- | --- |
| Different Event | Match | + | +++ |
| | Not Match | No effect | No effect |

Table 3 shows the how the likelihood of two people is affected by using a description of clothing. When the two people are from images or videos from the same event, then the likelihood of the people being the same individual decreases (---) a large amount when the clothing does not match. The "same event" means that the images have only a small difference between image capture time (i.e. less than a few hours), or that they have been classified as belonging to the same event either by a user or by an algorithm such as described in U.S. Pat. No. 6,606,411. Briefly summarized, a collection of images are classified into one or more events determining one or more largest time differences of the collection of images based on time or date clustering of the images and separating the plurality of images into the events based on having one or more boundaries between events which one or more boundaries correspond to the one or more largest time differences.

When the clothing of two people matches and the images are from the same event, then the likelihood that the two people are the same individual depends on the uniqueness of the clothing. The more unique the clothing that matches between the two people, the greater the likelihood that the two people are the same individual.

When the two people are from images belonging to different events, a mismatch between the clothing has no effect on the likelihood that the people are the same individuals (as it is likely that people change clothing).

Figure 18:
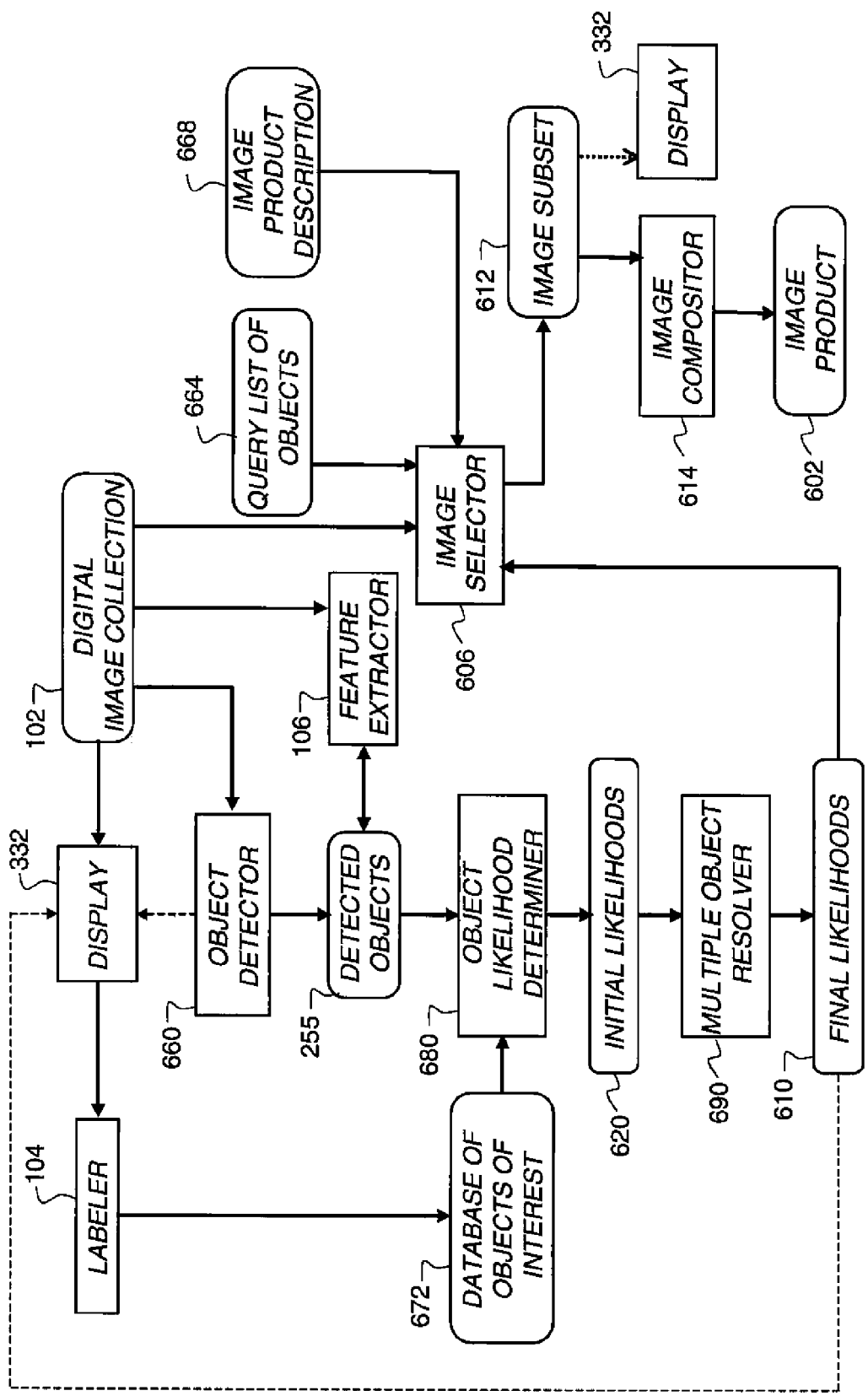
FIG. 18 is a flow chart of an embodiment of the present invention for finding a subset of images that contain objects from a query list of objects in a digital image collection.

As previously mentioned, the invention can be generalized beyond recognizing people, to a general object recognition method as shown in FIG. 18, which is similar to FIG. 2, for determining the image subset 612 to be used by the image compositor 614 for creating the image product 602. The digital image collection 102 containing objects is searched for objects of interest by an object detector 660. At least one image in the digital image collection 102 contains more than one of the objects of interest. The image subset 612 is displayed on the display 332 for review by the human user. The user supplies a query list of objects 664 and an image product description 668. For example, the query "Find 12 images that, taken together, contain at least one instance each of my 14 classic cars" can be used to make a calendar of a person's car collection.

The object detector 660 locates detected objects 255 (e.g. an automobile detector) and the feature extractor 106 determines a numerical description of the detected objects 255. The labeler 104 is used to identify, or label, some of the detected objects 255, and the labels are stored in association with the detected objects 254 in the database of objects of interest 672. The object likelihood determiner 680 produces initial likelihoods 620 by using the features associated with the detected objects 255, indicating the likelihood that detected objects 255 have the identities from the database of objects of interest 672. A multiple object resolver 690 uses both the features associated with the detected object 255 and the features associated with other detected objects in the image to produce final likelihoods 610. These final likelihoods 610 are used by the image selector 606 to satisfy the query described by the image product description 668 and the query list of objects 664 to produce the image subset 612.

Those skilled in the art will recognize that many variations may be made to the description of the present invention without significantly deviating from the scope of the present invention.

| PARTS LIST | |
|---|---|
| 40 | general control computer |
| 102 | digital image collection |
| 104 | labeler |
| 106 | feature extractor |
| 108 | person finder |
| 110 | person detector |
| 112 | digital image collection subset |
| 114 | database of individuals of interest |
| 202 | block |
| 204 | block |
| 206 | block |
| 208 | block |
| 240 | local feature detector |
| 242 | global feature detector |
| 244 | focal features |
| 246 | global features |
| 252 | identity of person of interest |
| 254 | detected people |
| 255 | detected objects |
| 256 | person classifier |
| 270 | face detector |
| 272 | capture time analyzer |

-continued

PARTS LIST

| | |
|---|---|
| 274 | detected people |
| 301 | digital camera phone |
| 303 | flash |
| 305 | lens |
| 311 | CMOS image sensor |
| 312 | timing generator |
| 314 | image sensor array |
| 316 | A/D converter circuit |
| 318 | DRAM buffer memory |
| 320 | digital processor |
| 322 | RAM memory |
| 324 | real-time clock |
| 328 | firmware memory |
| 330 | image/data memory |
| 332 | color display |
| 334 | user controls |
| 340 | audio codec |
| 342 | microphone |
| 344 | speaker |
| 350 | wireless modem |
| 352 | RF channel |
| 358 | phone network |
| 362 | dock interface |
| 364 | dock/charger |
| 370 | Internet |
| 372 | service provider |
| 602 | image product |
| 604 | image product description |
| 606 | image selector |
| 608 | query list of individuals |
| 610 | final likelihoods |
| 612 | image subset |
| 614 | image compositor |
| 616 | person likelihood determiner |
| 618 | multiple people resolver |
| 620 | initial likelihoods |
| 622 | score determiner |
| 640 | probability network former |
| 642 | probability network |
| 660 | object detector |
| 664 | query list of objects |
| 668 | image product description |
| 672 | database of objects of interest |
| 680 | object likelihood determiner |
| 690 | multiple object resolver |

The invention claimed is:

1. A method of searching through a collection of images, comprising using a digital processor to perform the following steps:
   (a) providing a list of individuals of interest and features associated with such individuals wherein the list of individuals includes a number of times $c_r$ that an individual should appear in selected subset of collection images;
   (b) detecting people in the collection images;
   (c) determining the likelihood(s) for each listed individual of appearing in each collection image in response to the detected people and the features associated with the listed individuals; and
   (d) selecting in response to the determined likelihood(s) a subset of one or more collection images such that at least two individuals from the list appear in the selected number of collection images and wherein the selected subset of collection images is chosen such that each individual from the list appears at least the number of times $c_r$ in the selected number of collection images.

2. The method of claim 1, wherein the selected subset of collection images are used to produce an image product.

3. The method of claim 2, wherein the image product is a framed photograph set, a photo calendar, an album, a slide show, a web page, a mug, a t-shirt, a mouse pad, or a puzzle.

4. The method of claim 1, wherein the step of determining the likelihood(s) further includes:
   i) using a first classifier to determine the likelihood that a detected person is a particular individual from the list individuals of interest; and
   ii) using a second classifier and the likelihoods from c) to determine the likelihood that a particular image contains a particular individual from the list.

5. The method of claim 1, wherein at least one image in the collection of images contains more than one person.

6. The method of claim 1, wherein the selected subset of images is displayed to a user for review.

7. The method of claim 6, wherein the user selects an image from the selected subset of images and that image is replaced with another image from the digital image collection.

8. The method of claim 1, wherein the step of determining the likelihood(s) further includes:
   i) detecting features for the detected people;
   ii) forming a probability network of links and nodes using the detected features for the detected people; and
   iii) using the probability network and the features associated with individuals of interest to determine the likelihood(s) for each listed individual of appearing in each collection image.

9. The method of claim 8, wherein the detected features include local features associated with the detected person and global features that are independent of the identity or position of the individual in the image associated with the detected person.

10. The method of claim 1, wherein the likelihoods are displayed to a user and the user provides input indicating the correctness of the labels.

11. The method of claim 1, wherein the likelihoods are updated based on the user input.

12. A method of searching though a collection of images, comprising using a digital processor to perform the following steps:
   (a) providing a list of individuals of interest and features associated with such individuals wherein the list of individuals includes a number of times $c_r$ that an individual should appear in selected subset of collection images;
   (b) detecting people in the collection images;
   (c) determining the likelihood(s) for each listed individual of appearing in each collection image in response to the detected people and the features associated with the listed individuals;
   (d) selecting in response to the determined likelihood(s) one or more subset(s) of collection images such that each individual from the list appears in each subset of collection images and wherein the selected subset of collection images is chosen such that each individual from the list appears at least the number of times $c_r$ in the selected number of collection images;
   (e) displaying the one or more subsets of collection images to a user; and
   (f) the user selecting one of the subsets of collection images.

13. The method of claim 12, wherein the images from the selected subset of collection images from f) are used to produce an image product.

14. The method of claim 13, wherein the image product is a framed photograph set, a photo calendar, an album, a slide show, a web page, a mug, a t-shirt, a mouse pad, or a puzzle.

15. A method of searching through a collection of images, comprising using a digital processor to perform the following steps:

(a) providing a list of objects of interest and features associated with such objects wherein the list of objects of interest includes a number of times $c_r$ that an object of interest should appear in selected subset of collection images;

(b) detecting objects in the collection images;

(c) determining the likelihood(s) for each listed object of appearing in each collection image in response to the detected objects and the features associated with the listed objects; and (d) selecting in response to the determined likelihood(s) a subset of one or more collection images such that each object from the list appears in the selected number of collection images and wherein the selected subset of collection images is chosen such that each object of interest from the list appears at least the number of times $c_r$ in the selected number of collection images.

16. The method of claim 15, wherein the images from the selected subset of collection images are used to produce an image product.

17. The method of claim 16, wherein the image product is a frames photograph set, a photo calendar, an album, a slide show, a web page, a mug, a t-shirt, a mouse pad, or a puzzle.

18. A method of searching through a collection of images, comprising using a digital processor to perform the following steps:

(a) providing a list of individuals of interest and features associated with such individuals;

(b) detecting people in the collection images;

(c) determining the likelihood(s) for each listed individual of appearing in each collection image in response to the detected people and the features associated with the listed individuals;

(d) selecting in response to the determined likelihood(s) a subset of one or more collection images; and (e) determining a likelihood that the selected subset of images contains each of the individuals of interest at least a number of times $c_r$ in the selected subset of collection images.

* * * * *